United States Patent [19]

Favor et al.

[11] Patent Number: 6,093,213

[45] Date of Patent: Jul. 25, 2000

[54] FLEXIBLE IMPLEMENTATION OF A SYSTEM MANAGEMENT MODE (SMM) IN A PROCESSOR

[75] Inventors: John G. Favor; Frederick D. Weber, both of San Jose, Calif.

[73] Assignee: Advanced Micro Devices, Inc., Sunnyvale, Calif.

[21] Appl. No.: 08/649,982

[22] Filed: May 16, 1996

Related U.S. Application Data

[63] Continuation-in-part of application No. 08/592,149, Jan. 26, 1996, abandoned.
[60] Provisional application No. 60/005,069, Oct. 6, 1995, and provisional application No. 60/005,021, Oct. 10, 1995.

[51] Int. Cl.[7] .................................................... G06F 9/44
[52] U.S. Cl. .............................. 703/27; 703/25; 712/209
[58] Field of Search .................... 395/500.45, 500.48, 395/651, 652, 670, 678, 682; 703/25, 27, 20; 712/209

[56] References Cited

U.S. PATENT DOCUMENTS

| | | | |
|---|---|---|---|
| 5,101,341 | 3/1992 | Circello et al. | 395/375 |
| 5,131,086 | 7/1992 | Circello et al. | 395/375 |
| 5,185,868 | 2/1993 | Tran | 395/375 |
| 5,201,056 | 4/1993 | Daniel et al. | 395/800 |
| 5,222,244 | 6/1993 | Carbine et al. | 395/800 |
| 5,233,696 | 8/1993 | Suzuki | 395/375 |
| 5,392,420 | 2/1995 | Balmer et al. | 395/500 |
| 5,438,668 | 8/1995 | Coon et al. | 395/375 |
| 5,488,710 | 1/1996 | Sato et al. | 395/452 |
| 5,513,330 | 4/1996 | Stiles | 395/375 |
| 5,530,804 | 6/1996 | Edgington et al. | 395/183.06 |
| 5,617,572 | 4/1997 | Pearce et al. | 395/750 |
| 5,623,673 | 4/1997 | Gephardt et al. | 395/733 |
| 5,675,772 | 10/1997 | Liu et al. | 395/500 |
| 5,737,579 | 4/1998 | Kimura et al. | 395/500 |
| 5,896,534 | 4/1999 | Pearce et al. | 395/680 |

FOREIGN PATENT DOCUMENTS

| | | | |
|---|---|---|---|
| 0 264 216 | 4/1988 | European Pat. Off. | G06F 9/44 |
| 0 380 854 A3 | 8/1990 | European Pat. Off. | G06F 9/38 |
| 0 454 984 A2 | 11/1991 | European Pat. Off. | G06F 9/38 |
| 0 498 654 A3 | 8/1992 | European Pat. Off. | G06F 9/38 |
| 0 506 972 A1 | 10/1992 | European Pat. Off. | G06F 9/30 |
| 0 534 597 | 3/1993 | European Pat. Off. | G06F 9/455 |
| 0 575 171 | 12/1993 | European Pat. Off. | G06F 12/02 |
| 0 651 320 | 5/1995 | European Pat. Off. | G06F 9/318 |
| 2 259 166 | 3/1993 | United Kingdom | G06F 9/46 |
| 2 263 985 | 8/1993 | United Kingdom | G06F 9/38 |
| 2 263 987 | 8/1993 | United Kingdom | G06F 9/38 |
| WO 93/01546 | 1/1993 | WIPO | G06F 9/38 |
| WO 93/20507 | 10/1993 | WIPO | G06F 9/38 |

*Primary Examiner*—Kevin J. Teska
*Assistant Examiner*—Thai Phan
*Attorney, Agent, or Firm*—Skjerven, Morrill, MacPherson, Franklin & Friel, L.L.P.; Ken Koestner

[57] ABSTRACT

A system management mode (SMM) of operating a processor includes only a basic set of hardwired hooks or mechanisms in the processor for supporting SMM. Most of SMM functionality, such as the processing actions performed when entering and exiting SMM, is "soft" and freely defined. A system management interrupt (SMI) pin is connected to the processor so that a signal on the SMI pin causes the processor to enter SMM mode. SMM is completely transparent to all other processor operating software. SMM handler code and data is stored in memory that is protected and hidden from normal software access.

33 Claims, 13 Drawing Sheets

700

| 15 | 13 | 12 | | 0 |
|---|---|---|---|---|
| ACT 710 | EXT 712 | ADDR 714 | | |

FLEXIBLE IMPLEMENTATION OF A SYSTEM MANAGEMENT MODE (SMM) IN A PROCESSOR

RELATED APPLICATIONS

This application is a continuation-in-part of application Ser. No. 08/592,149, filed on Jan. 26, 1996, now abandoned, which claims benefit of U.S. Provisional Application No. 60/005,069, filed Oct. 6, 1995 and U.S. Provisional Application No. 60/055,021, filed Oct. 10, 1995.

The present invention is related to subject matter disclosed in the following co-pending patent applications:

1. U.S. patent application Ser. No. 08/649,981 entitled, "Instruction Predecode and Multiple Instruction Decode," naming John G. Favor and Amos Den-Meir as inventors and filed on even date herewith;
2. U.S. patent application Ser. No. 08/649,995 entitled, "Instruction Buffer Organization Method and System," naming John G. Favor as inventor and filed on even date herewith;
3. U.S. patent application Ser. No. 08/592,150 entitled, "Self-Modifying Code Handling System," naming John G. Favor as inventors and filed on Jan. 26, 1996;
4. U.S. patent application Ser. No. 08/592,209, entitled, "Out-of-Order Load/Store Execution Control," naming John G. Favor, Amos Ben-Meir, Warren G. Staple ton, Jeffrey E. Trull and Mark E. Roberts as inventors and filed on Jan. 26, 1996;
5. U.S. patent application Ser. No. 08/649,242 entitled, "Out-of-Order Processing With Operation Bumping to Reduce Pipeline Delay," naming John G. Favor and Amos Ben-Meir as inventors and filed on even date herewith;
6. U.S. patent application Ser. No. 08/650,055 entitled, "Scan Chain for Rapidly Identifying First or Second Objects of Selected Types In A Sequential List," naming John G. Favor, Amos Ben-Meir and Jeffrey E. Trull as inventors and filed on even date herewith;
7. U.S. patent application Ser. No. 08/649,984 entitled, "Instruction Decoder Including Emulation Using Indirect Specifiers," naming John G. Favor as inventor and filed on even date herewith;
8. U.S. patent application Ser. No. 08/649,980 entitled, "Instruction Decoder Including Emulation Using Indirect Specifiers," naming John G. Favor as inventor and filed on even date herewith;
9. U.S. patent application Ser. No. 08/649,983 entitled, "RISC 86 Instruction Set," naming John G. Favor as inventor and filed on even date herewith;
10. U.S. patent application Ser. No. 08/592,041, entitled, "Design for a Simulation Module Using an Object-Oriented Programming Language," naming Warren G. Staple ton as inventor and filed on Jan. 26, 1996;
11. U.S. patent application Ser. No. 08/592,828 entitled, "Method for Analyzing The Performance of a Microprocessor," naming Waren G. Staple ton as inventor and filed on Jan. 26, 1996;
12. U.S. patent application Ser. No. 08/592,829 entitled, "Method for Simulating Vache Operation," naming Warren G. Staple ton as inventor and filed on Jan. 26, 1996;
13. U.S. patent application Ser. No. 08/649,243 entitled "Unified Multi-Function Operation Scheduler for Out-Of-Order Execution In A Superscalar Processor" naming John G. Favor, Amos Ben-Meir and Warren G. Staple ton as inventor and filed on even date herewith; and
14. U.S. patent application Ser. No. 08/649,947 entitled "A cache Controller With Table Walk Logic Tightly Coupled to Second Level Access Logic" filed on even date herewith;

each of which is incorporated herein by reference, in its entirety.

BACKGROUND OF THE INVENTION

1. Field of the Invention

This invention relates to processors. More specifically, this invention relates to processors implementing a system management mode of operation.

2. Description of the Related Art

System management mode (SMM) is a processor operating mode for performing high level systems functions such as power management or security functions.

Different microprocessor manufacturers have implemented SMM systems differently so that some SMM functionality is standard or semi-standard and other functionality is very different. A primary constant feature in different SMM implementations is that the high level functions operating under SMM, and the underlying SMM operations, are transparent both to operating systems and application software. Another common characteristic of various SMM implementations is that SMM functionality is hardcoded into the processor integrated circuit chip and, thus, is permanently fixed.

One problem with the conventional, hardcoded SMM implementation is that differences in SMM implementations by various processor manufacturers give rise to incompatibilities in functionality for processor chips that are otherwise designed for compatibility. A second problem is that the hardcoded SMM implementation may be highly advantageous for some applications, but disadvantageous for other applications. For example, a full-functionality but high overhead SMM implementation may be desired in some applications while a reduced-functionality, low overhead implementation is better suited in other applications. Another problem is that some computer system integrators wish to implement special-purpose or proprietary SMM functionality.

SUMMARY OF THE INVENTION

In accordance with the present invention, a system management mode (SMM) of operating a processor includes only a basic set of hardwired hooks or mechanisms in the processor for supporting SMM. Most of SMM functionality, such as the processing actions performed when entering and exiting SMM, is "soft" and freely defined. A system management interrupt (SMI) pin is connected to the processor so that a signal on the SMI pin causes the processor to enter SMM mode. SMM is completely transparent to all other processor operating software. SMM handler code and data is stored in memory that is protected and hidden from normal software access.

An embodiment of a RISC superscalar processor having a conventional hardwired system management mode (SMM) functionality, including SMM entry and exit processing and other nonconventional x86 instructions that support SMM software, is implemented in on-chip ROM resident RISC operation sequences. This hardwired implementation of SMM requires exact definition of SMM functionality to satisfy system requirements for multiple various vendors of computer systems which incorporate the RISC superscalar processor. An embodiment of a RISC superscalar processor in accordance with the present invention instead fetches SMM RISC operation sequences, when needed, from an external memory. In one embodiment, the SMM RISC operation sequences are stored in an area of address space where system BIOS resides (addresses E0000-FFFFF). As a result, each system vendor of multiple vendors can freely define much of the SMM functionality exactly as desired. For example, SMM entry and the associated state saving performed by the processor can be streamlined or extended, as desired.

In accordance with the present invention, system management mode is a "soft" implementation, having a definition in external RISC instruction code residing within BIOS. In this soft implementation, nearly all aspects of SMM are freely defined. A separate SMM entry slot is reserved for each SMM entry mechanism. Exit from SMM is furnished by a special "SMM exit" instruction. I/O trap filtering and checking are also defined. Furthermore, additional x86 SMM support instructions are defined, including instructions to save and restore segment descriptors.

In accordance with a first embodiment of the present invention, a computer system for operating in a system management mode (SMM) includes a processor having an instruction decoder, means connected to the processor for activating a system management activation signal and an instruction memory connected to the processor for supplying instructions to the processor. The instruction memory stores a software program including an SMM initialization routine, a routine for redirecting SMM operations to an external memory and an SMM termination routine.

In accordance with a second embodiment of the present invention, a computer system includes a processor and a memory connected to the processor. The memory includes a BIOS area of memory address space. A method of operating a computer system in a system management mode (SMM) includes the steps of receiving an SMM activating signal, recognizing the received SMM activating signal, initializing a SMM entry sequence by vectoring to a RISC instruction in a BIOS area of the memory address space, initializing the SMM, redirecting SMM operations to an external memory and terminating the SMM.

Several advantages are achieved by the described invention. One advantage is that the system management mode (SMM) operation is transparent to the operation of all other software so that other software operates identically whether SMM is active or inactive. Similarly, SMM operation is transparent to the operation of all normal CPU operating modes. Another advantage is that the functional definition of SMM is fully-defined, and therefore modifiable, by operating software. These advantages are attained while system management interrupts (SMI) and I/O access trapping are fully supported and SMM may be implemented to be compatible with conventional SMM operation.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION

Figure 1:
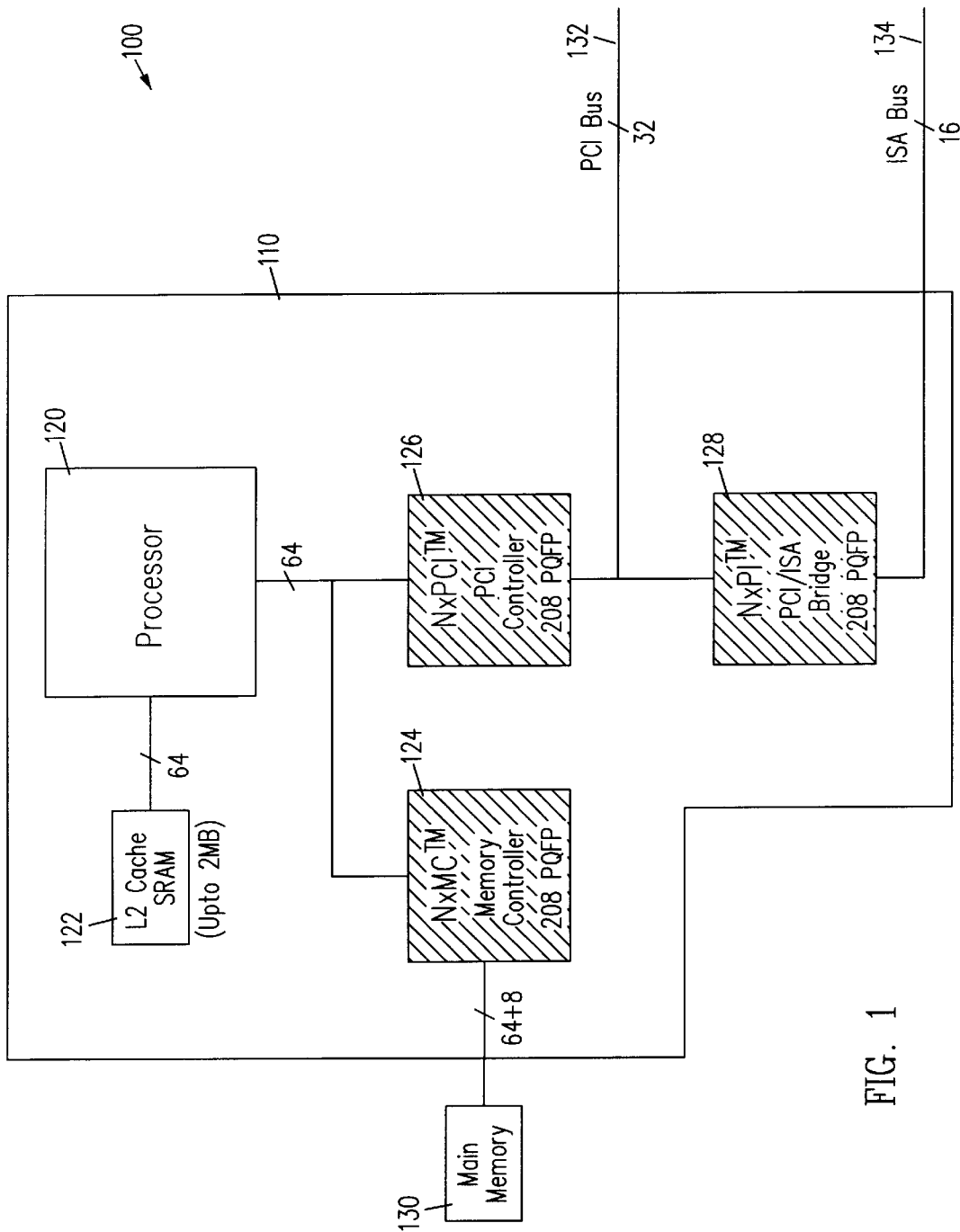
FIG. 1 is a block diagram which illustrates a computer system in accordance with one embodiment of the present invention.

Referring to FIG. 1, a computer system 100 is used in a variety of applications, including a personal computer application. The computer system 100 includes a computer motherboard 110 containing a processor 120 in accordance with an embodiment of the invention. Processor 120 is a monolithic integrated circuit which executes a complex instruction set so that the processor 120 may be termed a complex instruction set computer (CISC). Examples of complex instruction sets are the x86 instruction sets implemented on the well known 8086 family of microprocessors. The processor 120 is connected to a level 2 (L2) cache 122, a memory controller 124 and local bus controllers 126 and 128. The memory controller 124 is connected to a main memory 130 so that the memory controller 124 forms an interface between the processor 120 and the main memory 130. The local bus controllers 126 and 128 are connected to buses including a PCI bus 132 and an ISA bus 134 so that the local bus controllers 126 and 128 form interfaces between the PCI bus 132 and the ISA bus 134.

Figure 2:
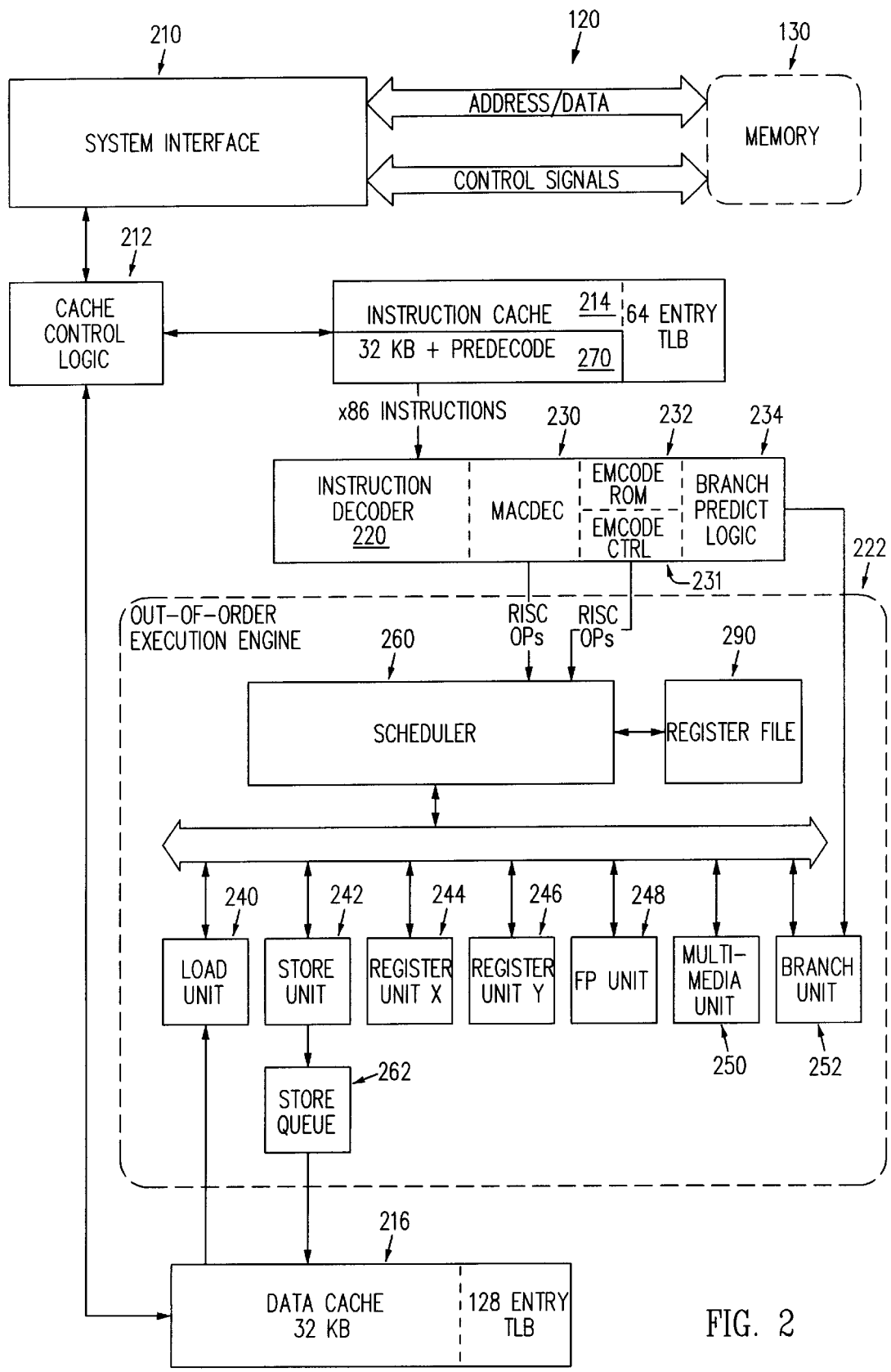
FIG. 2 is a block diagram illustrating one embodiment of processor or usage in the computer system shown in FIG. 1.

Referring to FIG. 2, a block diagram of an embodiment of processor 120 is shown. The core of the processor 120 is a RISC superscalar processing engine. Common x86 instructions are converted by instruction decode hardware to operations in an internal RISC instruction set. Other x86 instructions, exception processing, and other miscellaneous functionality is implemented as RISC operation sequences stored in on-chip ROM. Processor 120 has interfaces including a system interface 210 and an L2 cache control logic 212. The system interface 210 connects the processor 120 to other blocks of the computer system 100. The processor 120 accesses the address space of the computer system 100, including the main memory 130 and devices on local buses 132 and 134 by read and write accesses via the system interface 210. The L2 cache control logic 212 forms an interface between an external cache, such as the L2 cache 122, and the processor 120. Specifically, the L2 cache control logic 212 interfaces the L2 cache 122 and to an instruction cache 214 and a data cache 216 in the processor 120. The instruction cache 214 and the data cache 216 are level 1 (L1) caches which are connected through the L2 cache 122 to the address space of the computer system 100.

Instructions from main memory 130 are loaded into instruction cache 214 via a predecoder 270 for anticipated execution. The predecoder 270 generates predecode bits that are stored in combination with instruction bits in the instruction cache 214. The predecode bits, for example 3 bits, are fetched along with an associated instruction byte (8 bits) and used to facilitate multiple instruction decoding and reduce decode time. Instruction bytes are loaded into instruction cache 214 thirty-two bytes at a time as a burst transfer of four eight-byte quantities. Logic of the predecoder 270 is replicated eight times for usage four times in a cache line so that predecode bits for all eight instruction bytes are calculated simultaneously immediately before being written into the instruction cache 214. A predecode operation on a byte typically is based on information in one, two or three bytes so that predecode information may extend beyond an eight-byte group. Accordingly, the latter two bytes of an eight-byte group are saved for processing with the next eight-byte group in case of predecode information that overlaps two eight-byte groups. Instructions in instruction cache 214 are CISC instructions, referred to as macroinstructions. An instruction decoder 220 converts CISC instructions from instruction cache 214 into operations of a reduced instruction set computing (RISC) architecture instruction set for execution on an execution engine 222. A single macroinstruction from instruction cache 214 decodes into one or multiple operations for execution engine 222.

Figure 4:
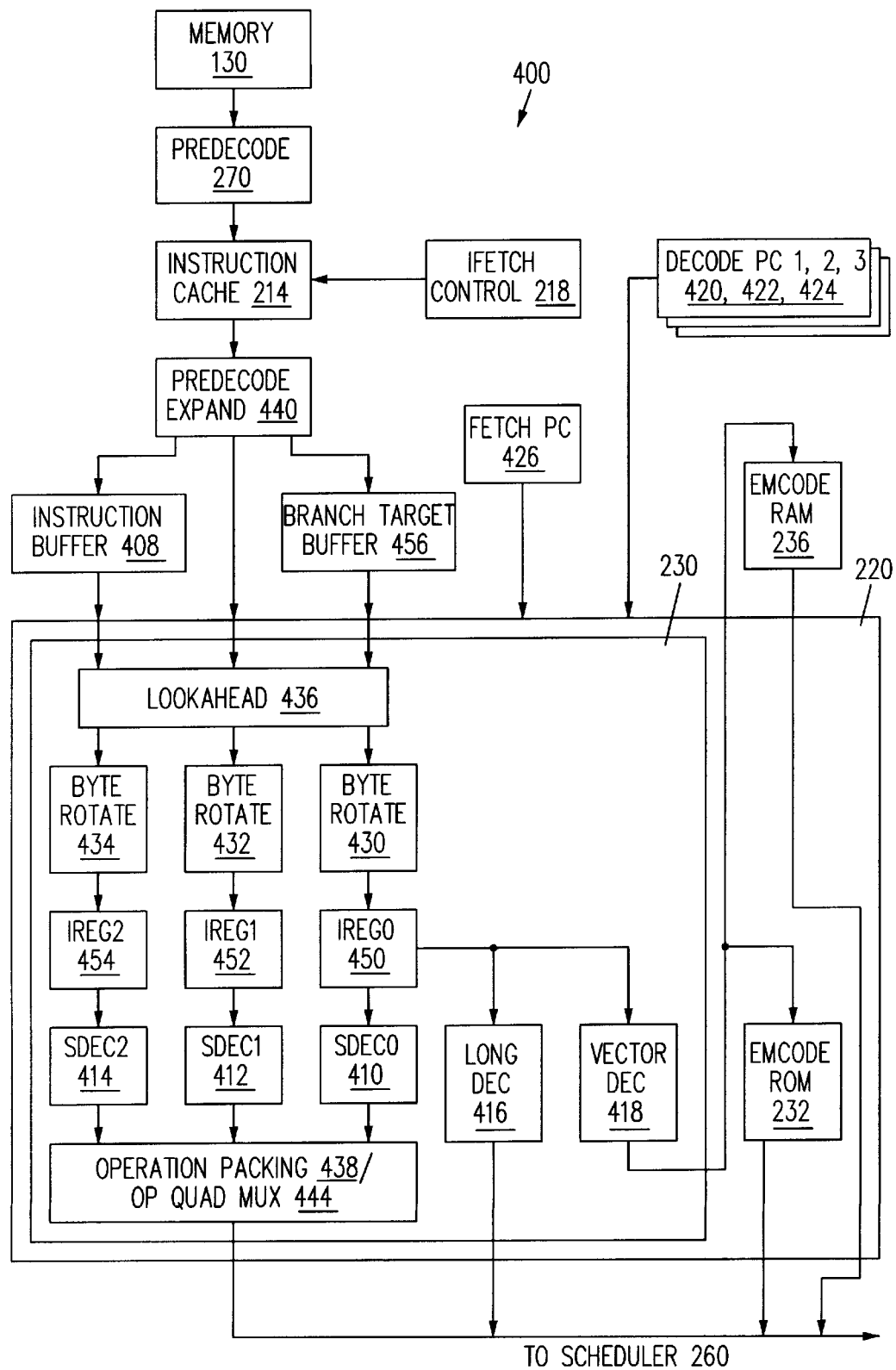
FIG. 4 is a schematic block diagram showing an embodiment of an instruction decoder used in the processor shown in FIG. 2.

Instruction decoder 220 has interface connections to the instruction cache 214 and an instruction fetch control circuit 218 (shown in FIG. 4). Instruction decoder 220 includes a macroinstruction decoder 230 for decoding most macroinstructions, an instruction decoder emulation circuit 231 including an emulation ROM 232 for decoding a subset of instructions such as complex instructions, and branch predict logic 234 for branch prediction and handling. Macroinstructions are classified according to the general type of operations into which the macroinstructions are converted. The general types of operations are register operations (RegOps), load-store operations (LdStOps), load immediate value operations (LIMMOps), special operations (SpecOps) and floating point operations (FpOps).

Execution engine 222 has a scheduler 260 and six execution units including a load unit 240, a store unit 242, a first register unit 244, a second register unit 246, a floating point unit 248 and a multimedia unit 250. The scheduler 260 distributes operations to appropriate execution units and the execution units operate in parallel. Each execution unit executes a particular type of operation. In particular, the load unit 240 and the store unit 242 respectively load (read) data or store (write) data to the data cache 216 (L1 data cache), the L2 cache 122 and the main memory 130 while executing a load/store operation (LdStOp). A store queue 262 temporarily stores data from store unit 242 so that store unit 242 and load unit 240 operate in parallel without conflicting accesses to data cache 216. Register units 244 and 246 execute register operations (RegOps) for accessing a register file 290. Floating point unit 248 executes floating point operations (FpOps). Multimedia unit 250 executes arithmetic operations for multimedia applications.

Scheduler 260 is partitioned into a plurality of, for example, 24 entries where each entry contains storage and logic. The 24 entries are grouped into six groups of four entries, called Op quads. Information in the storage of an entry describes an operation for execution, whether or not the execution is pending or completed. The scheduler monitors the entries and dispatches information from the entries to information-designated execution units.

Figure 3:
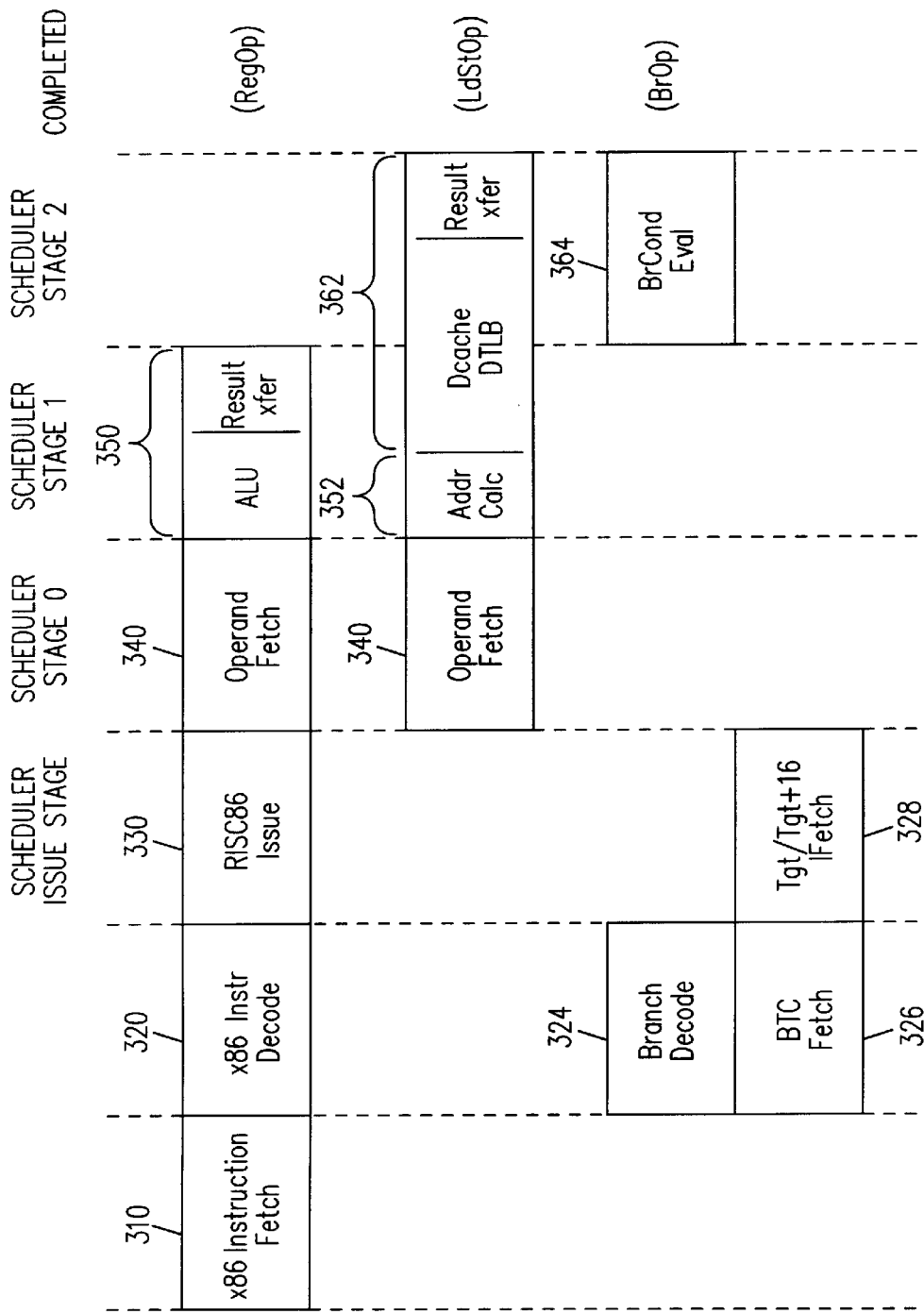
FIG. 3 is a timing diagram which illustrates pipeline timing for an embodiment of the processor shown in FIG. 2.

Referring to FIG. 3, processor 120 employs five and six stage basic pipeline timing. Instruction decoder 220 decodes two instructions in a single clock cycle. During a first stage 310, the instruction fetch control circuit 218 fetches CISC instructions into instruction cache 214. Predecoding of the CISC instructions during stage 310 reduces subsequent decode time. During a second stage 320, instruction decoder 220 decodes instructions from instruction cache 214 and loads an Op quad into scheduler 260. During a third stage 330, scheduler 260 scans the entries and issues operations to corresponding execution units 240 to 252 if an operation for the respective types of execution units is available. Operands for the operations issued during stage 330 are forwarded to the execution units in a fourth stage 340. For a RegOp, the operation generally completes in the next clock cycle which is stage 350, but LdStOps require more time for address calculation 352, data access and transfer of the results 362.

For branch operations, instruction decoder 220 performs a branch prediction 324 during an initial decoding of a branch operation. A branch unit 252 evaluates conditions for the branch at a later stage 364 to determine whether the branch prediction 324 was correct. A two level branch prediction algorithm predicts a direction of conditional branching, and fetching CISC instructions in stage 310 and decoding the CISC instructions in stage 320 continues in the predicted branch direction. Scheduler 260 determines when all condition codes required for branch evaluation are valid, and directs the branch unit 252 to evaluate the branch instruction. If a branch was incorrectly predicted, operations in the scheduler 260 which should not be executed are flushed and decoder 220 begins loading new Op quads from the correct address after the branch. A time penalty is incurred as instructions for the correct branching are fetched. Instruction decoder 220 either reads a previously-stored predicted address or calculates an address using a set of parallel adders. If a previously-predicted address is stored, the predicted address is fetched in stage 326 and instructions located at the predicted address are fetched in stage 328 without a delay for adders. Otherwise, parallel adders calculate the predicted address.

In branch evaluation stage 364, branch unit 252 determines whether the predicted branch direction is correct. If a predicted branch is correct, the fetching, decoding, and instruction-executing steps continue without interruption. For an incorrect prediction, scheduler 260 is flushed and instruction decoder 220 begins decoding macroinstructions from the correct program counter subsequent to the branch.

Referring to FIG. 4, a schematic block diagram illustrates an embodiment of an instruction preparation circuit 400 which is connected to the main memory 130. The instruction preparation circuit 400 includes the instruction cache 214 that is connected to the main memory 130 via the predecoder 270. The instruction decoder 220 is connected to receive instruction bytes and predecode bits from three alternative sources, the instruction cache 214, a branch target buffer (BTB) 456 and an instruction buffer 408. The instruction bytes and predecode bits are supplied to the instruction decoder 220 through a plurality of rotators 430, 432 and 434 via instruction registers 450, 452 and 454. The macroinstruction decoder 230 has input connections to the instruction cache 214 and instruction fetch control circuit 218 for receiving instruction bytes and associated predecode information. The macroinstruction decoder 230 buffers fetched instruction bytes in an instruction buffer 408 connected to the instruction fetch control circuit 218. The instruction buffer 408 is a sixteen byte buffer which receives and buffers up to 16 bytes or four aligned words from the instruction cache 214, loading as much data as allowed by the amount of free space in the instruction buffer 408. The instruction buffer 408 holds the next instruction bytes to be decoded and continuously reloads with new instruction bytes as old ones are processed by the macroinstruction decoder 230. Instructions in both the instruction cache 214 and the instruction buffer 408 are held in "extended" bytes, containing both memory bits (8) and predecode bits (5), and are held in the same alignment. The predecode bits assist the macroinstruction decoder 230 to perform multiple instruction decodes within a single clock cycle.

Instruction bytes addressed using a decode program counter (PC) 420, 422, or 424 are transferred from the instruction buffer 408 to the macroinstruction decoder 230. The instruction buffer 408 is accessed on a byte basis by decoders in the macroinstruction decoder 230. However on each decode cycle, the instruction buffer 408 is managed on a word basis for tracking which of the bytes in the instruction buffer 408 are valid and which are to be reloaded with new bytes from the instruction cache 214. The designation of whether an instruction byte is valid is maintained as the instruction byte is decoded. For an invalid instruction byte, decoder invalidation logic (not shown), which is connected to the macroinstruction decoder 230, sets a "byte invalid" signal. Control of updating of the current fetch PC 426 is synchronized closely with the validity of instruction bytes in the instruction buffer 408 and the consumption of the instruction bytes by the instruction decoder 220.

The macroinstruction decoder 230 receives up to sixteen bytes or four aligned words of instruction bytes fetched from the instruction fetch control circuit 218 at the end of a fetch cycle. Instruction bytes from the instruction cache 214 are loaded into a 16-byte instruction buffer 408. The instruction buffer 408 buffers instruction bytes, plus predecode information associated with each of the instruction bytes, as the instruction bytes are fetched and/or decoded. The instruction buffer 408 receives as many instruction bytes as can be accommodated by the instruction buffer 408 free space, holds the next instruction bytes to be decoded and continually reloads with new instruction bytes as previous instruction bytes are transferred to individual decoders within the macroinstruction decoder 230. The instruction predecoder 270 adds predecode information bits to the instruction bytes as the instruction bytes are transferred to the instruction cache 214. Therefore, the instruction bytes stored and transferred by the instruction cache 214 are called extended bytes. Each extended byte includes eight memory bits plus five predecode bits. The five predecode bits include three bits that encode instruction length, one D-bit that designates whether the instruction length is D-bit dependent, and a HasModRM bit that indicates whether an instruction code includes a modem field. The thirteen bits are stored in the instruction buffer 408 and passed on to the macroinstruction decoder 230 decoders. The instruction buffer 408 expands each set of five predecode bits into six predecode bits. Predecode bits enable the decoders to quickly perform multiple instruction decodes within one clock cycle.

The instruction buffer 408 receives instruction bytes from the instruction cache 214 in the memory-aligned word basis of instruction cache 214 storage so that instructions are loaded and replaced with word granularity. Thus, the instruction buffer 408 byte location 0 always holds bytes that are addressed in memory at an address of 0 (mod 16).

Instruction bytes are transferred from the instruction buffer 408 to the macroinstruction decoder 230 with byte granularity. During each decode cycle, the sixteen extended instruction bytes within the instruction buffer 408, including associated implicit word valid bits, are transferred to the plurality of decoders within the macroinstruction decoder 230. This method of transferring instruction bytes from the instruction cache 214 to the macroinstruction decoder 230 via the instruction buffer 408 is repeated with each decode cycle as long as instructions are sequentially decoded. When a control transfer occurs, for example due to a taken branch operation, the instruction buffer 408 is flushed and the method is restarted.

The current decode PC has an arbitrary byte alignment in that the instruction buffer 408 has a capacity of sixteen bytes but is managed on a four-byte word basis in which all four bytes of a word are consumed before removal and replacement or the word with four new bytes in the instruction buffer 408. An instruction has a length of one to eleven bytes and multiple bytes are decoded so that the alignment of an instruction in the instruction buffer 408 is arbitrary. As instruction bytes are transferred from the instruction buffer 408 to the macroinstruction decoder 230, the instruction buffer 408 is reloaded from the instruction cache 214.

Instruction bytes are stored in the instruction buffer 408 with memory alignment rather than a sequential byte alignment that is suitable for application of consecutive instruction bytes to the macroinstruction decoder 230. Therefore, a set of byte rotators 430, 432 and 434 are interposed between the instruction buffer 408 and each of the decoders of the macroinstruction decoder 230. Five instruction decoders, including three short decoders SDec0 410, SDec1 412 or SDec2 414, long decoder 416 and vectoring decoder 418, share the byte rotators 430, 432 and 434. In particular, the short decoder SDec0 410 and the combined long and vectoring decoder 418 share byte rotator 430. Short decoder SDec1 412 is associated with byte rotator 432 and short decoder SDec2 414 is associated with byte rotator 434.

A plurality of pipeline registers, specifically instruction registers 450, 452 and 454, are interposed between the byte rotators 430, 432 and 434 and the instruction decoder 220 to temporarily hold the instruction bytes, predecode bits and other information, thereby shortening the decode timing cycle. The other information held in the instruction registers 450, 452 and 454 includes various information for assisting instruction decoding, including prefix (e.g. 0F) status, immediate size (8-bit or 32-bit), displacement and long decodable length designations.

Although a circuit is shown utilizing three rotators and three short decoders, in other embodiments, different numbers of circuit elements may be employed. For example, one circuit includes two rotators and two short decoders.

Instructions are stored in memory alignment, not instruction alignment, in the instruction cache 214, the branch target buffer (BTB) 456 and the instruction buffer 408 so that the location of the first instruction byte is not known. The byte rotators 430, 432 and 434 find the first byte of an instruction.

The macroinstruction decoder 230 also performs various instruction decode and exception decode operations, including validation of decode operations and selection between different types of decode operations. Functions performed during decode operations include prefix byte handling, support for vectoring to the emulation code ROM 232 for emulation of instructions, and for branch predict logic 234 operations, branch unit interfacing and return address prediction. Based on the instruction bytes and associated information, the macroinstruction decoder 230 generates operation information in groups of four operations corresponding to Op quads. The macroinstruction decoder 230 also generates instruction vectoring control information and emulation code control information. The macroinstruction decoder 230 also has output connections to the scheduler 260 and to the emulation ROM 232 for outputting the Op quad information, instruction vectoring control information and emulation code control information. The macroinstruction decoder 230 does not decode instructions when the scheduler 260 is unable to accept Op quads or is accepting Op quads from emulation code ROM 232.

The macroinstruction decoder 230 has five distinct and separate decoders, including three "short" decoders SDec0 410, SDec1 412 and SDec2 414 that function in combination to decode up to three "short" decode operations of instructions that are defined within a subset of simple instructions of the x86 instruction set. Generally, a simple instruction is an instruction that translates to fewer than three operations. The short decoders SDec0 410, SDec1 412 and SDec2 414 each typically generate one or two operations, although zero operations are generated in certain cases such as prefix decodes. Accordingly for three short decode operations, from two to six operations are generated in one decode cycle. The two to six operations from the three short decoders are subsequently packed together by operation packing logic 438 into an Op quad since a maximum of four of the six operations are valid. Specifically, the three short decoders SDec0 410, SDec1 412 and SDec2 414 each attempt to decode two operations, potentially generating six operations. Only four operations may be produced at one time so that if more than four operations are produced, the operations from the short decoder SDec2 414 are invalidated. The five decoders also include a single "long" decoder 416 and a single "vectoring" decoder 418. The long decoder 416 decodes instructions or forms of instructions having a more complex address mode form so that more than two operations are generated and short decode handling is not available. The vectoring decoder 418 handles instructions that cannot be handled by operation of the short decoders SDec0 410, SDec1 412 and SDec2 414 or by the long decoder 416. The vectoring decoder 418 does not actually decode an instruction, but rather vectors to a location of emulation ROM 232 for emulation of the instruction. Various exception conditions that are detected by the macroinstruction decoder 230 are also handled as a special form of vectoring decode operation. When activated, the long decoder 416 and the vectoring decoder 418 each generates a full Op quad. An Op quad generated by short decoders SDec0 410, SDec1 412 and SDec2 414 has the same format as an Op quad generated by the long and vectoring decoders 416 and 418. The short decoder and long decoder Op quads do not include an OpSeq field. The macroinstruction decoder 230 selects either the Op quad generated by the short decoders 410, 412 and 414 or the Op quad generated by the long decoder 416 or vectoring decoder 418 as an Op quad result of the macroinstruction decoder 230 are each decode cycle. Short decoder operation, long decoder operation and vectoring decoder operation function in parallel and independently of one another, although the results of only one decoder are used at one time.

Each of the short decoders 410, 412 and 414 decodes up to seven instruction bytes, assuming the first byte to be an operation code (opcode) byte and the instruction to be a short decode instruction. Two operations (Ops) are generated with corresponding valid bits. Appropriate values for effective address size, effective data size, the current x86-standard B-bit, and any override operand segment register are supplied for the generation of operations dependent on these parameters. The logical address of the next "sequential" instruction to be decoded is supplied for use in generating the operations for a CALL instruction. Note that the word sequential is placed in quotation marks to indicate that, although the "sequential" address generally points to an instruction which immediately precedes the present instruction, the "sequential" address may be set to any addressed location. The current branch prediction is supplied for use in generating the operations for conditional transfer control instructions. A short decode generates control signals including indications of a transfer control instruction (for example, Jcc, LOOP, JMP, CALL), an unconditional transfer control instruction (for example, JMP, CALL), a CALL instruction, a prefix byte, a cc-dependent RegOp, and a designation of whether the instruction length is address or data size dependent. Typically one or both operations are valid, but prefix byte and JMP decodes do not generate a valid op. Invalid operations appear as valid NOOP operations to pad an Op quad.

The first short decoder 410 generates operations based on more than decoding of the instruction bytes. The first short decoder 410 also determines the presence of any prefix bytes decoded during preceding decode cycles. Various prefix bytes include 0F, address size override, operand size override, six segment override bytes, REP/REPE, REPNE and LOCK bytes. Each prefix byte affects a subsequent instruction decode in a defined way. A count of prefix bytes and a count of consecutive prefix bytes are accumulated during decoding and furnished to the first short decoder SDec0 410 and the long decoder 416. The consecutive prefix byte count is used to check whether an instruction being decoded is too long. Prefix byte count information is also used to control subsequent decode cycles, including checking for certain types of instruction-specific exception conditions. Prefix counts are reset or initialized at the end of each successful non-prefix decode cycle in preparation for decoding the prefix and opcode bytes of a next instruction. Prefix counts are also reinitialized when the macroinstruction decoder 230 decodes branch condition and write instruction pointer (WRIP) operations.

Prefix bytes are processed by the first short decoder 410 in the manner of one-byte short decode instructions. At most, one prefix byte is decoded in a decode cycle, a condition that is enforced through invalidation of all short decodes following the decode of a prefix byte. Effective address size, data size, operand segment register values, and the current B-bit, are supplied to the first short decoder 410 but can decode along with preceding opcodes.

The address size prefix affects a decode of a subsequent instruction both for decoding of instructions for which the generated operation depends on effective address size and for decoding of the address mode and instruction length of modr/m instructions. The default address size is specified by a currently-specified D-bit, which is effectively toggled by the occurrence of one or more address size prefixes.

The operand size prefix also affects the decode of a subsequent instruction both for decoding of instructions for which the generated operation depends on effective data size and for decoding of the instruction length. The default operand size is specified by a currently-specified x86-standard D-bit, which is effectively toggled by the occurrence of one or more operand size prefixes.

The segment override prefixes affect the decode of a subsequent instruction only in a case when the generation of a load-store operation (LdStOps) is dependent on the effective operand segment of the instruction. The default segment is DS or SS, depending on the associated general address mode, and is replaced by the segment specified by the last segment override prefix.

The REP/REPE and REPNE prefixes do not affect the decode of a subsequent instruction. If the instruction is decoded by the macroinstruction decoder 230, rather than the emulation code ROM 232, then any preceding REP prefixes are ignored. However, if the instruction is vectored, then the generation of the vector address is modified in some cases. Specifically, if a string instruction or particular neighboring opcode is vectored, then an indication of the occurrence of one or more of the REP prefixes and designation of the last REP prefix encountered are included in the vector address. For all other instructions the vector address is not modified and the REP prefix is ignored.

A LOCK prefix inhibits all short and long decoding except the decoding of prefix bytes, forcing the subsequent instruction to be vectored. When the vector decode cycle of this subsequent instruction occurs, so long as the subsequent instruction is not a prefix, the opcode byte is checked to ensure that the instruction is within a "lockable" subset of the instructions. If the instruction is not a lockable instruction, an exception condition is recognized and the vector address generated by the vectoring decoder 418 is replaced by an exception entry point address.

Instructions decoded by the second and third short decoders 412 and 414 do not have prefix bytes so that decoders 412 and 414 assume fixed default values for address size, data size, and operand segment register values.

Typically, the three short decoders generate four or fewer operations because three consecutive short decodes are not always performed and instructions often short decode into only a single operation. However, for the rare occurrence when more than four valid operations are generated, operation packing logic 438 inhibits or invalidates the third short decoder 414 so that only two instructions are successfully decoded and at most four operations are generated for packing into an Op quad.

When the first short decoder 410 is unsuccessful, the action of the second and third short decoders 412 and 414 are invalidated. When the second short decoder 412 is unsuccessful, the action of the third short decoder 414 is invalidated. When even the first short decode is invalid, the decode cycle becomes a long or vectoring decode cycle. In general, the macroinstruction decoder 230 attempts one or more short decodes and, if such short decodes are unsuccessful, attempts one long decode. If the long decode is unsuccessful, the macroinstruction decoder 230 performs a vectoring decode. Multiple conditions cause the short decoders 410, 412 and 414 to be invalidated. Most generally, short decodes are invalidated when the instruction operation code (opcode) or the designated address mode of a modr/m instruction does not fall within a defined short decode or "simple" subset of instructions. This condition typically restricts short decode instructions to those operations that generate two or fewer operations. Short decodes are also invalidated when not all of the bytes in the instruction buffer 408 for a decoded instruction are valid. Also, "cc-dependent" operations, operations that are dependent on status flags, are only generated by the first short decoder 410 to ensure that these operations are not preceded by and ".cc" RegOps. A short decode is invalidated for a second of two consecutive short decodes when the immediately preceding short decode was a decode of a transfer control instruction, regardless of the direction taken. A short decode is invalidated for a second of two consecutive short decodes when the first short decode was a decode of a prefix byte. In general, a prefix code or a transfer control code inhibits further decodes in a cycle.

Furthermore, no more than sixteen instruction bytes are consumed by the macroinstruction decoder 230 since the instruction buffer 408 only holds sixteen bytes at one time. Also, at most four operations can be packed into an Op quad. These constraints only affect the third short decoder 414 since the length of each short decoded instruction is at most seven bytes and operations in excess of four only arise in the third short decoder 414.

In a related constraint, if the current D-bit value specifies a 16-bit address and data size default, then an instruction having a length that is address and/or data dependent can only be handled by the first short decoder 410 since the predecode information is probably incorrect. Also, when multiple instruction decoding is disabled, only the first short decoder 410 is allowed to successfully decode instructions and prefix bytes.

Validation tests are controlled by short decoder validation logic (not shown) in the macroinstruction decoder 230 and are independent of the operation of short decoders 410, 412 and 414. However, each of the short decoders 410, 412 and 414 does set zero, one or two valid bits depending on the number of operations decoded. These valid bits, a total of six for the three short decoders 410, 412 and 414, are used by the operation packing logic 438 to determine which operations to pack into an Op quad and to force invalid operations to appear as NOOP (no operation) operations. The operation packing logic 438 operates without short decoder validation information since valid short decodes and associated operations are preceded only by other valid short decodes and associated operations.

The short decoders 410, 412 and 414 also generate a plurality of signals representing various special opcode or modr/m address mode decodes. These signals indicate whether a certain form of instruction is currently being decoded by the instruction decoder 220. These signals are used by short decode validation logic to handle short decode validation situations.

The instruction bytes, which are stored unaligned in the instruction buffer 408, are aligned by byte rotators 430, 432 and 434 as the instruction bytes are transferred to the decoders 410–418. The first short decoder SDec0 410, the long decoder 416 and the vectoring decoder 418 share a first byte rotator 430. The second and third short decoders SDec1 412 and SDec2 414 use respective second and third byte rotators 432 and 434. During each decode cycle, the three short decoders SDec0 410, SDec1 412 and SDec2 414 attempt to decode what are, most efficiently, three short decode operations using three independently-operating and parallel byte rotators 430, 432 and 434. Although the multiplexing by the byte rotators 430, 432 and 434 of appropriate bytes in the instruction buffer 408 to each respective decoder SDec0 410, SDec1 412 and SDec2 414 is conceptually dependent on the preceding instruction decode operation, instruction length lookahead logic 436 uses the predecode bits to enable the decoders to operate substantially in parallel.

The long and vectoring decoders 416 and 418, in combination, perform two parallel decodes of eleven instruction bytes, taking the first byte to be an opcode byte and generating either a long instruction decode Op quad or a vectoring decode Op quad. Information analyzed by the long and vectoring decoders 416 and 418 includes effective address size, effective data size, the current B-bit and DF-bit, any override operand segment register, and logical addresses of the next sequential and target instructions to be decoded. The long and vectoring decoders 416 and 418 generate decode signals including an instruction length excluding preceding prefix bits, a designation of whether the instruction is within the long decode subset of instructions, a RET instruction, and an effective operand segment register, based on a default implied by the modr/m address mode plus any segment override.

During a decode cycle in which none of the short decoders SDec0 410, SDec1 412 and SDec2 414 successfully decodes a short instruction, the macroinstruction decoder 230 attempts to perform a long decode using the long decoder 416. If a long decode cannot be performed, a vectoring decode is performed. In some embodiments, the long and vectoring decoders 416 and 418 are conceptually separate and independent decoders, just as the long and vectoring decoders 416 and 418 are separate and independent of the short decoders 410, 412 and 414. Physically, however, the long and vectoring decoders 416 and 418 share much logic and generate similar Op quad outputs. Instructions decoded by the long decoder 416 are generally included within the short decode subset of instructions except for an address mode constraint such as that the instruction cannot be decoded by a short decoder because the instruction length is greater than seven bytes or because the address has a large displacement that would require generation of a third operation to handle to displacement. The long decoder 416 also decodes certain additional modr/m instructions that are not in the short decode subset but are sufficiently common to warrant hardware decoding. Instruction bytes for usage or decoding by the long decoder 416 are supplied from the instruction buffer 408 by the first byte rotator 430, the same instruction multiplexer that supplies instruction bytes to the first short decoder SDec0 410. However, while the first short decoder SDec0 410 receives only seven bytes, the long decoder 416 receives up to eleven consecutive instruction bytes, corresponding to the maximum length of a modr/m instruction excluding prefix bytes. Thus, the first byte rotator 430 is eleven bytes wide although only the first seven bytes are connected to the first short decoder SDec0 410. The long decoder 416 only decodes one instruction at a time so that associated predecode information within the instruction buffer 408 is not used and is typically invalid.

The first byte of the first byte rotator 430 is fully decoded as an opcode byte and, in the case of a modr/m instruction, the second instruction byte and possibly the third are fully decoded as modr/m and sib bytes, respectively. The existence of a 0F prefix is considered in decoding of the opcode byte. The 0F prefix byte inhibits all short decoding since all short decode instructions are non-0F or "one-byte" opcodes. Because all prefix bytes are located within the "one-byte" opcode space, decoding of a 0F prefix forces the next decode cycle to be a two-byte opcode instruction, such as a long or vectoring decode instruction. In addition to generating operations based on the decoding of modr/m and sib bytes, the first byte rotator 430 also determines the length of the instruction for usage by various program counters, whether the instruction is a modr/m instruction for inhibiting or invalidating the long decoder, and whether the instruction is an instruction within the long decode subset of operation codes (opcodes). The long decoder 416 always generates four operations and, like the short decoders 410, 412 and 414, presents the operations in the form of an emulation code-like Op quad, excluding an OpSeq field. The long decoder 416 handles only relatively simple modr/m instructions. A long decode Op quad has two possible forms that differ only in whether the third operation is a load operation (LdOp) or a store operation (StOp) and whether the fourth operation is a RegOp or a NOOP. A first long decode Op quad has the form:

| | |
|---|---|
| LIMM | t2, <imm32> |
| LIMM | t1, <disp32> |
| LD.b/d | t8L/t8,@(<gam>)OS.a |
| <RegOp> | ... |

A second long decode Op quad has the form:

| | |
|---|---|
| LIMM | t2, <imm32> |
| LIMM | t1, <disp32> |
| ST.b/d | @(<gam>),t2L/t2,OS.a |
| NOOP | |

The @(<gam>) address mode specification represents an address calculation corresponding to that specified by the modr/m and/or sib bytes of the instruction, for example @(AX+BX*4+LD). The <imm32> and <disp32> values are four byte values containing the immediate and displacement instruction bytes when the decoded instruction contains such values.

The long decoder 416, like the first short decoder 410, generates operations taking into account the presence of any prefix bytes decoded by the short decoders during preceding decode cycles. Effective address size, data size, operand segment register values, and the current B-bit are supplied to the long decoder 416 and are used to generate operations. No indirect size or segment register specifiers are included within the final operations generated by the long decoder 416.

Only a few conditions inhibit or invalidate an otherwise successful long decode. One such condition is an instruction operation code (opcode) that is not included in the long decode subset of instructions. A second condition is that not all of the instruction buffer 408 bytes for the decoded instruction are valid.

The vectoring decoder 418 handles instructions that are not decoded by either the short decoders or the long decoder 416. Vectoring decodes are a default case when no short or long decoding is possible and sufficient valid bytes are available. Typically, the instructions handled by the vectoring decoder 418 are not included in the short decode or long decode subsets but also result from other conditions such as decoding being disabled or the detection of an exception condition. During normal operation, only non-short and non-long instructions are vectored. However, all instructions may be vectored. Undefined opcodes are always vectored. Only prefix bytes are always decoded. Prefix bytes are always decoded by the short decoders 410, 412 and 414.

When an exception condition is detected during a decode cycle, a vectoring decode is forced, generally overriding any other form of decode without regard for instruction byte validity of the decoded instruction. When a detected exception condition forces a vectoring decode cycle, the generated Op quad is undefined and the Op quad valid bit for presentation to the scheduler 260 is forced to zero. The Op quad valid bit informs the scheduler 260 that no operations are to be loaded to the scheduler 260. As a result, no Op quad is loaded into the scheduler 260 during an exception vectoring decode cycle.

Few conditions inhibit or invalidate a vectoring decode. One such condition is that not all of the bytes in the instruction buffer 408 are valid.

When an instruction is vectored, control is transferred to an emulation code entry point. An emulation code entry point is either in internal emulation code ROM 232 or in external emulation code RAM 236. The emulation code starting from the entry point address either emulates an instruction or initiates appropriate exception processing.

A vectoring decode cycle is properly considered a macroinstruction decoder 230 decode cycle. In the case of a vectoring decode, the macroinstruction decoder 230 generate the vectoring quad and generate the emulation code address into the emulation code ROM 232. Following the initial vectoring decode cycle, the macroinstruction decoder 230 remains inactive while instructions are generated by the emulation code ROM 232 or emulation code RAM 236 until a return from emulation (ERET) OpSeq is encountered. The return from emulation (ERET) sequencing action transitions back to macroinstruction decoder 230 decoding. During the decode cycles following the initial vectoring decode cycle, the macroinstruction decoder 230 remains inactive, continually attempting to decode the next "sequential" instruction but having decode cycles repeatedly invalidated until after the ERET is encountered, thus waiting by default to decode the next "sequential" instruction.

Instruction bytes for usage or decoding by the vectoring decoder 418 are supplied from the instruction buffer 408 by the first byte rotator 430, the same instruction multiplexer that supplies instruction bytes to the first short decoder SDec0 410 and to the long decoder 416. The vectoring decoder 418 receives up to eleven consecutive instruction bytes, corresponding to the maximum length of a modr/m instruction excluding prefix bytes. Thus, the full eleven byte width of the first byte rotator 430 is distributed to both the long decoder 416 and the vectoring decoder 418. The predecode information within the instruction buffer 408 is not used by the vectoring decoder 418.

As in the case of the long decoder 416, the first byte of the first byte rotator 430 is fully decoded as an opcode byte and, in the case of a modr/m instruction, the second instruction byte and possibly the third are fully decoded as modr/m and sib bytes, respectively. The vectoring decoder 418 generates operations taking into account the presence of any prefix bytes decoded by the short decoders during preceding decode cycles. The existence of a 0F prefix is considered in decoding of the opcode byte. In addition to generating operations based on the decoding of modr/m and sib bytes, the first byte rotator 430 also determines the length of the instruction for usage by various program counters, whether the instruction is a modr/m instruction for inhibiting or invalidating the long decoder, and whether the instruction is an instruction within the long decode subset of operation codes (opcodes). If not, a vectoring decode is initiated. Effective address size, data size and operand segment register values are supplied to the vectoring decoder 418 and are used to generate operations. No indirect size or segment register specifiers are included within the final operations generated by the vectoring decoder 418.

During a vectoring decode cycle, the vectoring decoder 418 generates a vectoring Op quad, generates an emulation code entry point or vector address, and initializes an emulation environment. The vectoring Op quad is specified to pass various information to initialize emulation environment scratch registers.

The value of the emulation code entry point or vector address is based on a decode of the first and second instruction bytes, for example the opcode and modr/m bytes, plus other information such as the presence of an 0F prefix, a REP prefix or the like. In the case of vectoring caused by an exception condition, the entry point or vector address is based on a simple encoded exception identifier.

The emulation environment is stored for resolving environment dependencies. All of the short decoders 410, 412 and 414 and long decoder 416 directly resolve environmental dependencies, such as dependencies upon effective address and data sizes, as operations are generated so that these operations never contain indirect size or register specifiers. However, emulation code operations do refer to such effective address and data size values for a particular instance of the instruction being emulated. The emulation environment is used to store this additional information relating to the particular instruction that is vectored. This information includes general register numbers, effective address and data sizes, an effective operand segment register number, the prefix byte count, and a record of the existence of a LOCK prefix. The emulation environment also loads a modr/m reg field and a modr/m regm field are loaded into Reg and Regm registers. The emulation environment is initialized at the end of a successful vectoring decode cycle and remains at the initial state for substantially the duration of the emulation of an instruction by emulation code, until an ERET code is encountered.

The vectoring decoder 418 generates four operations of an Op quad in one of four forms. All four forms include three LIMM operations. The four forms differ only in the immediate values of the LIMM operations and in whether the third operation is an LEA operation or a NOOP operation.

A first vectoring decode Op quad has the form:

| LIMM | t2, <imm32> | |
|------|-------------|---|
| LIMM | t1, <disp32> | |
| LEA  | t6,@(<gam>),_.a | |
| LIMM | t7,LogSeqDecPC[31..0] | //logical seq. next //instr. PC |

A second vectoring decode Op quad has the form:

| LIMM | t2, <imm32> |
|------|-------------|
| LIMM | t1, <disp32> |
| NOOP | |
| LIMM | t7,LogSeqDecPC[31..0] |

A third vectoring decode Op quad has the form:

| LIMM | t2, <+/− 1/2/4> | //equiv to "LDK(D)S t2, +1/+2" |
|------|-----------------|---|
| LIMM | t1, <+/− 2/4/8> | //equiv to "LDK(D)S t1, +2/+4" |
| NOOP | | |
| LIMM | t7,LogSeqDecPC[31..0] | |

A fourth vectoring decode Op quad has the form:

| | | |
|---|---|---|
| LIMM | t2, <+2/4> | //equiv to "LDKD t2, +2" |
| LIMM | t1, <disp32> | |
| LD | t6,@(SP),SS.s | |
| LIMM | t7,LogSeqDecPC[31..0] | |
| | //predicted RET target adr | |
| | //from Return Address Stack | |

The first two forms of vectoring Op quads apply for most opcodes. The first form is used for memory-referencing modr/m instructions for which the LEA operation is used to compute and load a general address mode effective operand address into a treg. The second form is used for non-modr/m and register-referencing modr/m instructions. For instructions having the second form no address is necessarily computed, although the <imm32> and <disp32 > values remain useful insofar as they contain instruction bytes following the opcode byte. The third form of vectoring Op quad is used for all string instructions plus some neighboring non-modr/m instructions. A fourth form of vectoring Op quad supports special vectoring and emulation requirements for near RET instructions.

The macroinstruction decoder 230 has four program counters, including three decode program counters 420, 422 and 424, and one fetch program counter 426. A first decode program counter, called an instruction PC 420, is the logical address of the first byte, including any prefix bytes, of either the current instruction being decoded or, if no instruction is currently decoding, the next instruction to be decoded. If the decode operation is a multiple instruction decode, instruction PC 420 points to the first instruction of the multiple instructions to be decoded. The instruction PC 420 corresponds to the architectural address of an instruction and is used to generate instruction fault program counters for handling of exceptions. The instruction PC 420 is passed down the scheduler 260 with corresponding Op quads and is used by an operation commit unit (OCU) (not shown) of the scheduler 260 to produce instruction fault program counters to be saved during exception processing. When an Op quad is generated by the macroinstruction decoder 230, the current instruction PC 420 value is tagged to the Op quad and loaded into the Scheduler 260 Op quad entry along with the Op quad. A second decode program counter, called a logical decode PC 422, is the logical address of the next instruction byte to be decoded and addresses either an opcode byte or a prefix byte. A third decode program counter, called a linear decode PC 424, is the linear address of the next instruction byte to be decoded and addresses either an opcode byte or a prefix byte. The logical decode PC 422 and the linear decode PC 424 point to the same instruction byte. The linear decode PC 424 designates the address of the instruction byte currently at the first byte rotator 430.

The various decoders in the macroinstruction decoder 230 function on the basis of decoding or consuming either prefix bytes or whole instructions minus any prefix bytes so that prefixes are generally handled as one-byte instructions. Therefore, the address boundaries between instruction and prefix byte decodes are more important than instruction boundaries alone. Consequently, at the beginning of each decode cycle, the next instruction byte to be decoded is not necessarily the true beginning of an instruction.

At the beginning of a decode cycle the logical decode PC 422 and the linear decode PC 424 contain the logical and linear addresses of the next instruction to be decoded, either an instruction or a prefix byte. The linear decode PC 424 is a primary program counter value that is used during the decoding process to access the instruction buffer 408. The linear decode PC 424 represents the starting point for the decode of a cycle and specifically controls the byte rotator feeding bytes from the instruction buffer 408 to the first short decoder 410 and to the long and vectoring decoders 416 and 418. The linear decode PC 424 also is the reference point for determining the instruction addresses of any further short decode instructions or prefix bytes, thus generating control signals for the byte rotators feeding the second and third short decoders 412 and 414.

The linear decode PC 424 also acts secondarily to check for breakpoint matches during the first decode cycles of new instructions, before prefix bytes are decoded, and to check for code segment overruns by the macroinstruction decoder 230 during successful instruction decode cycles.

The logical decode PC 422 is used for program counter-related transfer control instructions, including CALL instructions. The logical decode PC 422 is supplied to the branch unit 234 to be summed with the displacement value of a PC-relative transfer control instruction to calculate a branch target address. The logical decode PC 422 also supports emulation code emulation of instructions. The next sequential logical decode program counter (PC) 422 is available in emulation code from storage in a temporary register by the vectoring Op quad for general usage. For example, the next sequential logical decode PC 422 is used to supply a return address that a CALL instruction pushes on a stack.

A next logical decode PC 426 is set to the next sequential logical decode program counter value and has functional utility beyond that of the logical decode PC 422. The next logical decode PC 426 directly furnishes the return address for CALL instructions decoded by the macroinstruction decoder 230. The next logical decode PC 426 also is passed to emulation code logic during vectoring decode cycles via one of the operations within the vectoring Op quad.

During a decode cycle, the linear decode PC 424 points to the next instruction bytes to be decoded. The four least significant bits of linear decode PC 424 point to the first instruction byte within the instruction buffer 408 and thereby directly indicate the amount of byte rotation necessary to align the first and subsequent instruction bytes in the instruction cache 214. The first byte rotator 430 is an instruction multiplexer, specifically a 16:1 byte multiplexer, for accessing bytes in the instruction buffer 408 that are offset by the linear decode PC 424 amount. The first byte rotator 430 is seven bytes wide for the first short decoder SDec0 410 and eleven bytes wide for the long decoder 416 and the vectoring decoder 418 in combination. Shared logic in the first short decoder SDec0 410, the long decoder 416 and the vectoring decoder 418 generate a first instruction length value ILen0 for the first instruction. The second and third byte rotators 432 and 434 are seven byte-wide instruction multiplexers, specifically 16:1 byte multiplexers. The second byte rotator 432 accesses bytes in the instruction buffer 408 that are offset by the sum of the linear decode PC 424 amount and the first instruction length ILen0. Logic in the second short decoder SDec0 412 generate a second instruction length value ILen1 for the second instruction. The third byte rotator 434 accesses bytes in the instruction buffer 408 that are offset by the sum of the linear decode PC 424 amount and the first and second instruction lengths ILen0 and ILen1. The byte rotators 430, 432 and 434 multiplex instruction bytes but not predecode bits. The byte rotators 430, 432 and 434 are controlled using predecode information in which the predecode bits associated with the first opcode byte or the first byte of the first instruction directly controls the second rotator 432. The first byte of the second instruction directly controls the third rotator 434. Each predecode code implies an instruction length but what is applied to the next rotator is a pointer. The pointer is derived by taking the four least significant bits of the program counter at the present instruction plus the length to attain the program counter to the next instruction.

All program counters 420, 422, 424 and 426 in the macroinstruction decoder 230 are initialized during instruction and exception processing. A plurality of signal sources activate this initialization. First, the branch predict logic 234 supplies a target branch address when a PC-relative transfer control instruction is decoded and predicted taken. Second, a return address stack (not shown) supplies a predicted return target address when a near RET instruction is decoded. Third, the scheduler 260 generates a correct and alternate branch address when the macroinstruction decoder 230, along with the remaining circuits in the processor 120, is restarted by the scheduler 260 due to a mispredicted branch condition (BRCOND) operation. Fourth, register unit 244, the primary RegOp execution unit, supplies a new decode address when a WRIP RegOp is executed. The WRIP RegOp execution allows emulation code to explicitly redirect instruction decoding. In all four cases, a logical address is supplied and utilized to simultaneously reinitialize the three decode program counters 420, 422 and 424. For the linear decode PC 424, a linear address value is supplied by adding the supplied logical address to the current code segment base address to produce the corresponding linear address for loading into linear decode PC 424. The logical address is loaded into the current instruction PC 420 and the logical decode PC 422. For each decode cycle until a next reinitialization, the macroinstruction decoder 230 sequentially and synchronously updates the current instruction PC 420, the logical decode PC 422 and the linear decode PC 424 as instruction bytes are successfully decoded and consumed by the individual decoders of macroinstruction decoder 230.

Generation of the instruction lengths IlenO and Ilen1 occurs serially. To hasten this serial process by emulating a parallel operation, instruction length lookahead logic 436 quickly determines the instruction lengths ILen0 and ILen1 using four predecode bits specifying the length of each instruction byte in the instruction buffer 408. The predecode bits associated with the opcode byte of the first instruction byte in the instruction buffer 408, the first instruction byte being multiplexed to the first short decoder SDec0 410, directly specifies a byte index of the opcode byte of the second instruction byte in the instruction buffer 408. The predecode bits associated with the opcode byte of the second instruction byte in the instruction buffer 408, the second instruction byte being multiplexed to the second short decoder SDec1 412, directly specifies a byte index of the opcode byte of the third instruction byte in the instruction buffer 408. The instruction length lookahead logic 436 includes two four-bit-wide 16:1 multiplexers for generating the byte indices of the opcode bytes of the second and third instruction bytes in the instruction buffer 408.

The instruction lookahead logic 436 also includes logic for determining validity of the sets of predecode bits. Predecode bits are valid when the associated instruction byte is the start of a valid short decode instruction. Specifically, the instruction lookahead logic 436 determines whether predecode bits for a given byte in the instruction buffer 408 point to the same byte, implying a zero length for an instruction starting at that byte. If so, that byte is not the start of a short decode instruction and no further short decoding is possible. Otherwise, a short decode operation is possible and predecode bits point to the beginning of the next instruction.

The predecoder 270 connected between the main memory 130 and the instruction cache 214 has eight logic units, each of which examines its associated instruction byte plus, in some cases, the following one or two instruction bytes. The first instruction byte is decoded as an opcode byte and the second and third instruction bytes, if the opcode byte is a modr/m opcode, are decoded as modr/m and sib bytes. Based on these three bytes, the length of an instruction and whether the instruction is classified as a "short" instruction are determined. The length of the instruction is added to a four-bit fixed value corresponding to the position of the logic unit with respect to the sixteen logic units to determine the byte index used by the instruction length lookahead logic 436. This byte index is set as the value of the predecode bits if the instruction falls within the criteria of a short instruction. For instruction bytes not meeting the short instruction criteria, the predecode bits are set to the four-bit fixed value corresponding to the position of the logic unit with respect to the sixteen logic units without increment to designate an instruction length of zero. An implied instruction length of zero is indicative that the instruction is not a short instruction. The predecode bits are truncated from four bits to three since short decode instructions are never longer than seven bytes and the most significant bit is easily reconstructed from the three predecode bits and the associated fixed byte address. The expansion from three to four predecode bits is performed by predecode expansion logic 440 having sixteen logic units corresponding to the sixteen instruction bytes of the instruction cache 214. The sixteen logic units of predecode expansion logic 440 operate independently and simultaneously on predecode bits as the instruction bytes are fetched from the instruction cache 214 to the instruction buffer 408.

The final two of the thirty-two instruction bytes that are predecoded and loaded to the instruction cache 214 have only one or two bytes for examination by the predecoder 270. For modr/m opcodes the full instruction length cannot be determined. Thus logic units for bytes 14 and 15 in the predecoder 270 are modified from logic units for bytes 0 through 13. For instruction byte 15, logic unit 15 of the predecoder 270 forces an instruction length of zero for all modr/m opcodes and for non-short decode instructions. For instruction byte 14, an effective instruction length of zero is forced for modr/m opcodes with an address mode requiring examination of a sib byte to reliably determine instruction length, as well as for non-short instructions.

During each decode cycle, the macroinstruction decoder 230 checks for several exception conditions, including an instruction breakpoint, a pending nonmaskable interrupt (NMI), a pending interrupt (INTR), a code segment overrun, an instruction fetch page fault, an instruction length greater than sixteen bytes, a nonlockable instruction with a LOCK prefix, a floating point not available condition, and a pending floating point error condition. Some conditions are evaluated only during a successful decode cycle, other conditions are evaluated irrespective of any decoding actions during the cycle. When an active exception condition is detected, all instruction decode cycles including short, long and vectoring decode cycles, are inhibited and an "exception" vectoring decode is forced in the decode cycle following exception detection. The recognition of an exception condition is only overridden or inhibited by inactivity of the macroinstruction decoder 230, for example, when emulation code Op quads are accepted by the scheduler 260, rather than short and long or vector decoder Op quads. In effect, recognition and handling of any exception conditions are delayed until an ERET Op seq returns control to the macroinstruction decoder 230.

During the decode cycle that forces exception vectoring, a special emulation code vector address is generated in place of a normal instruction vector address. The vectoring Op quad that is generated by the long and vectoring decoders 416 and 418 is undefined. The exception vector address is a fixed value except for low-order bits for identifying the particular exception condition that is recognized and handled. When multiple exception conditions are detected simultaneously, the exceptions are ordered in a priority order and the highest priority exception is recognized.

The instruction breakpoint exception, the highest priority exception condition, is recognized when the linear decode PC 424 points to the first byte of an instruction including prefixes, the linear decode PC 424 matches a breakpoint address that is enabled as an instruction breakpoint, and none of the instruction breakpoint mask flags are clear. One mask flag (RF) specifically masks recognition of instruction breakpoints. Another mask flag (BNTF) temporarily masks NMI requests and instruction breakpoints.

The pending NMI exception, the penultimate priority exception, is recognized when an NMI request is pending and none of the NMI mask flags are clear. One mask (NF) specifically masks nonmaskable interrupts. Another mask flag (BNTF) temporarily masks NMI requests and instruction breakpoints.

The pending INTR exception, the next exception in priority following the ending NMI exception, is recognized when an INTR request is pending and the interrupt flag (IF) and temporary interrupt flag (ITF) are clear.

The code segment overrun exception, the next exception in priority following the pending INTR exception, is recognized when the macroinstruction decoder 230 attempts to successfully decode a set of instructions beyond a current code segment limit.

The instruction fetch page fault exception, having a priority immediately lower than the code segment overrun exception, is recognized when the macroinstruction decoder 230 requires additional valid instruction bytes from the instruction buffer 408 before decoding of another instruction or prefix byte is possible and the instruction translation lookaside buffer (ITB) signals that a page fault has occurred on the current instruction fetch. A faulting condition of the instruction fetch control circuit 218 is repeatedly retried so that the ITB continually reports a page fault until the page fault is recognized by the macroinstruction decoder 230 and subsequent exception handling processing stops and redirects instruction fetching to a new address. The fault indication from the ITB has the same timing as instructions loaded from the instruction cache 214 and, therefore, is registered in the subsequent decode cycle. The ITB does not necessarily signal a fault on consecutive instruction fetch attempts so that the macroinstruction decoder 230 holds the fault indication until fetching is redirected to a new instruction address. Upon recognition of a page fault, additional fault information is loaded into a special register field.

The instruction length greater than sixteen bytes exception, which has a priority just below the instruction fetch page fault exception, is recognized when the macroinstruction decoder 230 attempts to successfully decode an instruction having a total length including prefix bytes of greater than fifteen bytes. The instruction length greater than sixteen bytes exception is detected by counting the number of prefix bytes before an actual instruction is decoded and computing the length of the rest of the instruction when it is decoded. If the sum of the prefix bytes and the remaining instruction length is greater than sixteen bytes, an error is recognized.

The nonlockable instruction with a LOCK prefix exception, having a priority below the instruction length exception, is recognized when the macroinstruction decoder 230 attempts to successfully decode an instruction having a LOCK prefix, in which the instruction is not included in the lockable instruction subset. The nonlockable LOCK instruction exception is detected based on decode of the opcode byte and existence of a 0F prefix. The nonlockable LOCK instruction exception only occurs during vectoring decode cycles since the LOCK prefix inhibits short and long decodes.

The floating point not available exception, having a next to lowest priority, is recognized when the macroinstruction decoder 230 attempts to successfully decode a WAIT instruction or an ESC instruction that is ont a processor control ESC, and the reporting of a floating point error is pending. Macroinstruction decoder 230 detects the floating point not available exception based on decoding of an opcode and modr/m byte, in addition to the existence of a 0F prefix.

During each decode cycle, the macroinstruction decoder 230 attempts to perform some form of instruction decode of one or more instructions. Typically, the macroinstruction decoder 230 succeeds in performing either one or multiple short decodes, one long decode or an instruction vectoring decode. Occasionally no decode is successful for three types of conditions including detection of an active exception condition, lack of a sufficient number of valid bytes in the instruction buffer 408, or the macroinstruction decoder 230 does not advance due to an external reason.

When an active exception condition is detected all forms of instruction decode are inhibited and, during the second decode cycle after detection of the exception condition, an exception vectoring decode cycle is forced, producing an invalid Op quad.

When an insufficient number of valid bytes are available in the instruction buffer 408 either no valid bytes are held in the instruction buffer 408 or at least the first opcode is valid and one of the decoders decodes the instruction but the decoded instruction length requires further valid bytes in the instruction buffer 408, not all of which are currently available.

When an external reason prevents macroinstruction decoder 230 advancement either the scheduler 260 is full and unable to accept an additional Op quad during a decode cycle or the scheduler 260 is currently accepting emulation code Op quads so that the macroinstruction decoder 230 is inactive awaiting a return to decoding.

In the latter two cases, the decode state of the macroinstruction decoder 230 is inhibited from advancing and the macroinstruction decoder 230 simply retries the same decodes in the next decode cycle. Control of macroinstruction decoder 230 inhibition is based on the generation of a set of decode valid signals with a signal corresponding to each of the decoders. For each decoder there are multiple reasons which are combined into decoder valid signals to determine whether that decoder is able to successfully perform a decode. The decoder valid signals for all of the decoders are then monitored, in combination, to determine the type of decode cycle to perform. The type of decode cycle is indicative of the particular decoder to perform the decode. The external considerations are also appraised to determine whether the selected decode cycle type is to succeed. Signals indicative of the selected type of decode cycle select between various signals internal to the macroinstruction decoder 230 generated by the different decoders, such as alternative next decode PC values, and also are applied to control an Op quad multiplexer 444 which selects the input Op quad applied to the scheduler 260 from the Op quads generated by the short decoders, the long decoder 416 and the vectoring decoder 418.

In the case of vectoring decode cycles, the macroinstruction decoder 230 also generates signals that initiate vectoring to an entry point in either internal emulation code ROM 232 or external emulation code RAM 236. The macroinstruction decoder 230 then monitors the active duration of emulation code fetching and loading into the scheduler 260.

The instruction decoder 220 includes the branch unit (not shown) for performing branch prediction so that operations are speculatively executed. Performance of an out-of-order processor is enhanced when branches are handled quickly and accurately so that pipeline-draining mispredictions are avoided. The processor 120 employs a two-level branch prediction algorithm that is disclosed in detail in U.S. Pat. No. 5,454,117, entitled CONFIGURABLE BRANCH PREDICTION FOR A PROCESSOR PERFORMING SPECULATIVE EXECUTION (Puziol et al., issued Sep. 26, 1995), U.S. Pat. No. 5,327,547, entitled TWO-LEVEL BRANCH PREDICTION CACHE (Stiles et al., issued Jul. 5, 1994), U.S. Pat. No. 5,163,140, entitled TWO-LEVEL BRANCH PREDICTION CACHE (Stiles et al., issued Nov. 10, 1992), and U.S. Pat. No. 5,093,778; entitled INTEGRATED SINGLE STRUCTURE BRANCH PREDICTION CACHE (Favor et al., issued Mar. 3, 1993). The processor 120 further utilizes an 8,192-entry branch history table (BHT) (not shown) which is indexed by combining four program counter bits with nine bits of global branch history. Each BHT entry contains two history bits. The BHT is a dual-port RAM allowing both a read/lookup access and a write/update access. BHT lookups and updates do not conflict since they take place in opposite half phases of a clock cycle. The large number of entries of the BHT is supplied in a reasonable integrated circuit area because the BHT is only predicting conditional branch directions so that entries are not tagged and predicted branch target addresses are not stored, except for a 16-entry return address stack (not shown). Accordingly, an access to the BHT is similar to a direct mapping into a cache-like structure in which the the BHT is indexed to access an entry in the BHT and the accessed entry is presumed to be a branch instruction. For branches other than returns, the target address is calculated during the decode cycle. The target address is calculated with sufficient speed using a plurality of parallel adders (not shown) that calculate all possible target addresses before the location of a branch instruction is known. By the end of the decode cycle, the branch predict logic 234 determines which, if any, target address result is valid.

If a branch is predicted taken, the target address is immediately known and the target instructions are fetched on the following cycle, causing a one-cycle taken-branch penalty. The taken-branch penalty is avoided using a branch target buffer (BTB) 456. The BTB 456 includes sixteen entries, each entry having sixteen instruction bytes with associated predecode bits. The BTB 456 is indexed by the branch address and is accessed during the decode cycle. Instructions from the BTB 456 are sent to the instruction decoder 220, eliminating the taken-branch penalty, for a cache hit of the BTB 456 when the BHT predicts a taken branch.

During each decode cycle, the linear decode PC 424 is used in a direct-mapped manner to address the BTB 456. If a hit, which is realized before the end of the decode cycle, occurs with a BTB entry, a PC-relative conditional transfer control instruction is decoded by a short decoder and the control transfer is predicted taken, then two actions occur. First, the initial target linear fetch address directed to the instruction cache 214 is changed from the actual target address to a value which points to an instruction byte immediately following the valid target bytes contained in the BTB entry. This modified fetch address is contained in the BTB entry and directly accessed from the BTB entry. Second, the instruction byte and predecode information from the entry is loaded into the instruction buffer 408 at the end of the decode cycle. If a PC-relative conditional transfer control instruction is decoded by a short decoder and the control transfer is predicted taken, but a miss occurs, then a new BTB entry is created with the results of the target instruction fetch. Specifically, simultaneously with the first successful load of target instruction bytes into the instruction buffer 408 from the instruction cache 214, the same information is loaded into a chosen BTB entry, replacing the previous contents. The target fetch and instruction buffer 408 load otherwise proceed normally.

Each entry includes a tag part and a data part. The data part holds sixteen extended instruction bytes including a memory byte and three associated predecode bits. The correspondence of the memory byte is memory-aligned with the corresponding instruction buffer 408 location. The tag part of a BTB entry holds a 30-bit tag including the 32-bit linear decode PC 424 associated with the transfer control instruction having a cached target, less bits [4:1], an entry valid bit and the 30-bit modified initial target linear instruction fetch address. No explicit instruction word valid bits are used since the distance between the true target address and the modified target address directly implies the number and designation of valid instruction words within the BTB 456.

The purpose of the BTB 456 is to capture branch targets within small to medium sized loops for the time period a loop and nested loops are actively executed. In accordance with this purpose, at detection of a slightest possibility of an inconsistency, the entire BTB is invalidated and flushed. The BTB 456 is invalidated and flushed upon a miss of the instruction cache 214, any form of invalidation of instruction cache 214, an ITB miss, or any form of ITB invalidation. Branch targets outside temporal or spatial locality are not effectively cached. Typically, the BTB 456 contains only a small number of entries so that complexity is reduced while the majority of performance benefit of ideal branch target caching is achieved.

PC-relative branch target address calculation logic performs the target address calculation. Branch target address calculation logic is utilized only for PC-relative transfer control instructions that are decoded by a short decoder SDec0 410, SDec1 414 or SDec2 416. Specifically, the branch target address calculation logic is utilized for the short decode branch instructions including Jcc disp8, LOOP disp8, JMP disp8, JMP disp16/32, and CALL disp16/32. Each short decoder SDec0 410, SDec1 412 and SDec2 414 includes logical and linear branch target address calculation logic 452. All three sets of logical and linear branch target address calculation logic (not shown) function in parallel while the short decoders 410, 412 and 414 determine whether any of the operations is a PC-relative short decode branch instruction. The logical and linear branch target address calculation logic sum the logical program counter of the branch, the length of the branch instruction and the sign-extended displacement of the branch instruction and conditionally mask the high-order 16 bits of the sum, depending on calculation sizing, to produce a logical target address. The logical and linear branch target address calculation logic sum the logical target address with the current code segment base address to produce a linear target address. If the branch is taken, either unconditionally or predicted taken, then calculated addresses corresponding to the decoded short decode branch instruction are used to reinitialize the logical decode PC 422 and linear decode PC 424. If the branch is predicted not taken, the logical address is saved with the associated short decode branch instruction (BRCOND Op) in a scheduler 260 Op quad entry. The logical target address is compared to the current code segment limit value to monitor for a limit violation.

If the logical and linear branch target address calculation logic detects a limit violation, whether the branch is predicted taken or predicted not taken, then a special tag bit indicative of the limit violation is set in the scheduler 260 Op quad entry holding the operations generated from the branch instruction. Subsequently, when the operation commit unit (OCU) of the scheduler 260 attempts to commit this Op quad, the Op quad is handled as containing a fault and aborted. The macroinstruction decoder 230 generates signals that initiate vectoring to a fault handler in emulation code ROM 232. The fault handler temporarily inhibits decoding by the short and long decoders and jumps to the fault PC address of the violating instruction associated with the faulted Op quad. Ultimately, the branch instruction is redecoded and vectored to instruction emulation code. The emulation code recognizes the limit violation if the branch is actually taken and appropriately handles the violation.

The processor 120 generally responds to a fault condition by vectoring to a specific fault handler in the emulation code ROM 232. The fault handler includes operations defined within the RISC instruction set which perform a routine that determines the source of the fault, an appropriate response to the fault and steps to initiate the appropriate response. As an alternative in appropriate cases, the processor 120 also includes a special "load alternate fault handler" operation which initiates a special fault response. Exceptions that are detected during decode time direct execution to a fixed set of entry points, one entry point for each possible exception condition through operation of the vectoring decoder 418 which activates the alternate fault handler and designates a fault handler address. The alternate fault handler is advantageous for allowing modified full handling of special conditions. The load alternate fault handler instruction passes through the instruction decoder 220 pipeline in the manner of all instructions, but causes any subsequent exception condition to invoke a different vector instruction ROM entry point. The alternate fault handler terminates upon completion of execution of the current macroinstruction.

One example of the advantage of the alternate fault handler arises with respect to a repeated move string instruction (REP MOVs). To perform multiple interactions very quickly, a capability to reorder the sequence of operations is important. The sequence of operations typically includes a load to a first pointer-designated address, a store to a second pointer-designated address and, if both the load and store are successful, an increment of the first and second pointers and a decrement of a counter. For additional efficiency, the pointers are incremented and the counter decremented before completing the store operation. However, if a fault or exception occurs during the sequence of operations, the sequence is aborted with the counters and pointers in the wrong state. For example, the architectural x86 SI, DI and CX registers do not have the correct value. The alternate fault handler is used by specifying, prior to the sequence, an alternate fault handler that performs a cleanup after a repeated move fault. The sequence proceeds without the overhead of intermediate instructions for tracking the pointers and counters. If no errors occur, the alternate fault handler terminates without effect. However, if an error occurs, the alternate fault handler is invoked. This alternate fault handler is specific to the particular sequence of operations and performs clean-up accordingly and jumps to the default fault handler. Advantageously, highly efficient code improves speed performance without hindrance from the alternate fault handler until an error arises, at which time the error is addressed.

The branch history table (BHT) stores recent history information, particularly branch direction information, about conditional transfer control instructions that have been encountered in the past. When a branch is repeated, stored information relating to the branch is analyzed to predict the current direction of the branch. Subsequently, the stored information is updated based on the actual direction taken by the branch. The stored information is derived from the direction of a particular newly encountered branch, the recent direction history of the particular branch and the recent direction history of other branches. The stored information is based on a plurality of sets of two-bit state machines and also on a direction history of the last nine branch executions, whether the last nine branch executions pertained to the particular branch or other branches. The instruction address of the particular newly encountered branch is used to select one of the plurality of sets of two-bit state machines. The direction history of the last nine branch executions is used to select a particular two-bit state machine in the selected set of state machines. Each state machine is a two-bit saturating counter for counting the directions taken by the most recent few branches that accessed this particular state machine. Typically a particular state machine is accessed by the same static branch, although other branches may access the same state machine. A larger state machine value is indicative of more taken instances of a branch. A smaller state machine value is indicative of more not taken instances of a branch. Upon selection of a state machine, the state machine is accessed. If the present overall count is "greater" then a branch is predicted taken. If the present overall count is "lesser" then a branch is predicted not taken. The direction history of the most recent nine branch executions is held in a nine-bit shift register which is clocked or shifted each time a branch instruction is successfully decoded. The immediate branch direction just predicted is the new direction history value that is shifted into the shift register. A history bit value of one indicates a branch taken. A history bit value of zero indicates a branch not taken.

During a decode cycle, the linear decode PC 424 is used to perform a BHT table lookup. If a PC-relative branch instruction is decoded, then the accessed state machine immediately predicts the branch direction, although the actual instruction subsequently fetched and decoded is determined at the end of the decode cycle by the macroinstruction decoder 230. Subsequently, the branch condition (BRCOND) operation generated by decoding of the conditional branch instruction is resolved by logic in the scheduler 260, at which time the state machine is updated. If the branch is actually taken, the state machine is decremented unless already at the maximum value (3). If the branch is actually not taken, the state machine is incremented unless already at a minimum value (0). Accordingly, a state machine value of 0 and 1 respectively indicate a strong and mild prediction of a branch not taken. A state machine value of 2 and 3 respectively indicate a mild and a strong prediction of a branch taken. To support updating of BHT entries, a copy of the branch address and direction history bits for accessing the BHT and a copy of the state machine value are passed to the scheduler 260 along with the branch condition (BRCOND) operation. Since a maximum of one BRCOND is included in an Op quad, the BHT support information is tagged to the Op quad applied to the scheduler 260. It is advantageous for reducing circuit size and complexity that the BHT does not contain entry tags (addresses of linear decode PC 424 associated with decoded conditional branches) that are typical in cache structures. It is further advantageous that the BHT has a large number of entries so that the contention rate is low.

The information saved in a scheduler 260 Op quad along with an associated BRCOND operation has a width of fifteen bits including four branch address bits, nine current history bits, and the immediately accessed two state machine bits, the upper bit of which is also the predicted direction for the immediate branch. The first thirteen bits are used, when necessary, to reaccess the BHT and to update a state machine value. The final two bits are modified to create the new state machine value.

When a branch is mispredicted, the set of history values in the nine-bit branch history shift register are corrected to reflect the actual direction taken by the branch. Furthermore, the shift register is "shifted back" to correspond to the mispredicted branch, then updated based on the actual branch direction and which branch direction was predicted.

A return address stack (RAS) (not shown) is a target address cache for return (RET) transfer control instructions. RAS is an eight entry, 32-bit wide, single-ported RAM that is managed as a circular buffer using a single three-bit pointer. During each cycle at most one access, either a read access for a RET decode or a write access for a CALL decode, is performed. RAS caches RET return addresses and predicts return addresses which inherently specify a target address indirectly, in contrast to other transfer control instructions that contain a direct specification of target address. RAS is advantageously utilized since a particular RET instruction often changes target address between different executions of the instruction. RAS discovers and anticipates the target address value for each RET instruction execution through monitoring of the return addresses that are saved—pushed on a stack—by CALL instructions. Corresponding CALL and RET instructions typically occur dynamically in pairs and in last-in-first-out LIFO order with respect to other CALL and RET instruction pairs.

Each time a CALL instruction is successfully decoded, the logical return address of the CALL instruction is saved (pushed) to a circular buffer managed as a LIFO stack. Each time a RET instruction is successfully decoded, the return address value currently on the top of the RAS is employed as the predicted target address for the RET and the value is popped from the RAS. RAS achieves a high prediction rate although mispredictions do occur because CALLs and RETs do not always occur in nested pairs, only near CALLs and RETs and not far CALLs and RETs are supported, and mispredictions occur because of the finite depth of the RAS. When a conditional branch misprediction occurs, RAS attempts to restore the state prior to misprediction by setting the top of stack pointer to the previous condition because CALL and RET instructions may have been speculatively decoded and the top-of-stack pointer thereby modified. The original pointer, before the misprediction, is to be restored. Restoration following a misprediction is supported by the scheduler 260. Each scheduler 260 Op quad is tagged with a current initial top-of-stack pointer value in effect during the decode cycle in which the Op quad was generated. When the BRCOND Op generated for a conditional branch instruction is resolved and found to be mispredicted, the top-of-stack pointer tagged to the scheduler Op quad is supplied to the RAS during a restart cycle that is generated by the scheduler 260. RAS replaces the current top-of-stack value with the scheduler Op quad top-of-stack pointer tag.

Figure 5:
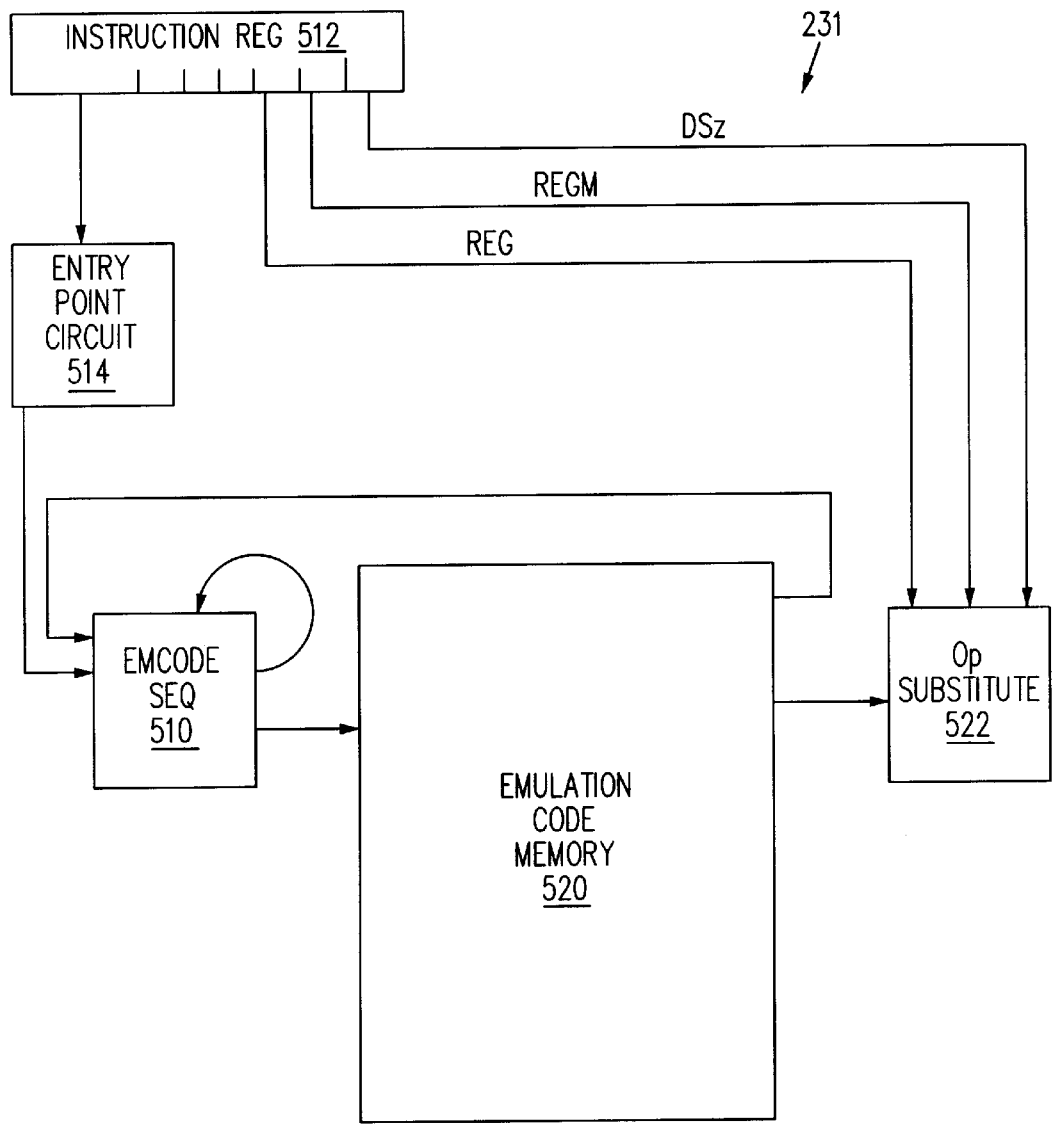
FIG. 5 is a schematic block diagram which depicts a structure of an emulation code sequencer and an emulation code memory of the instruction decoder shown in FIG. 4.
Figure 6:
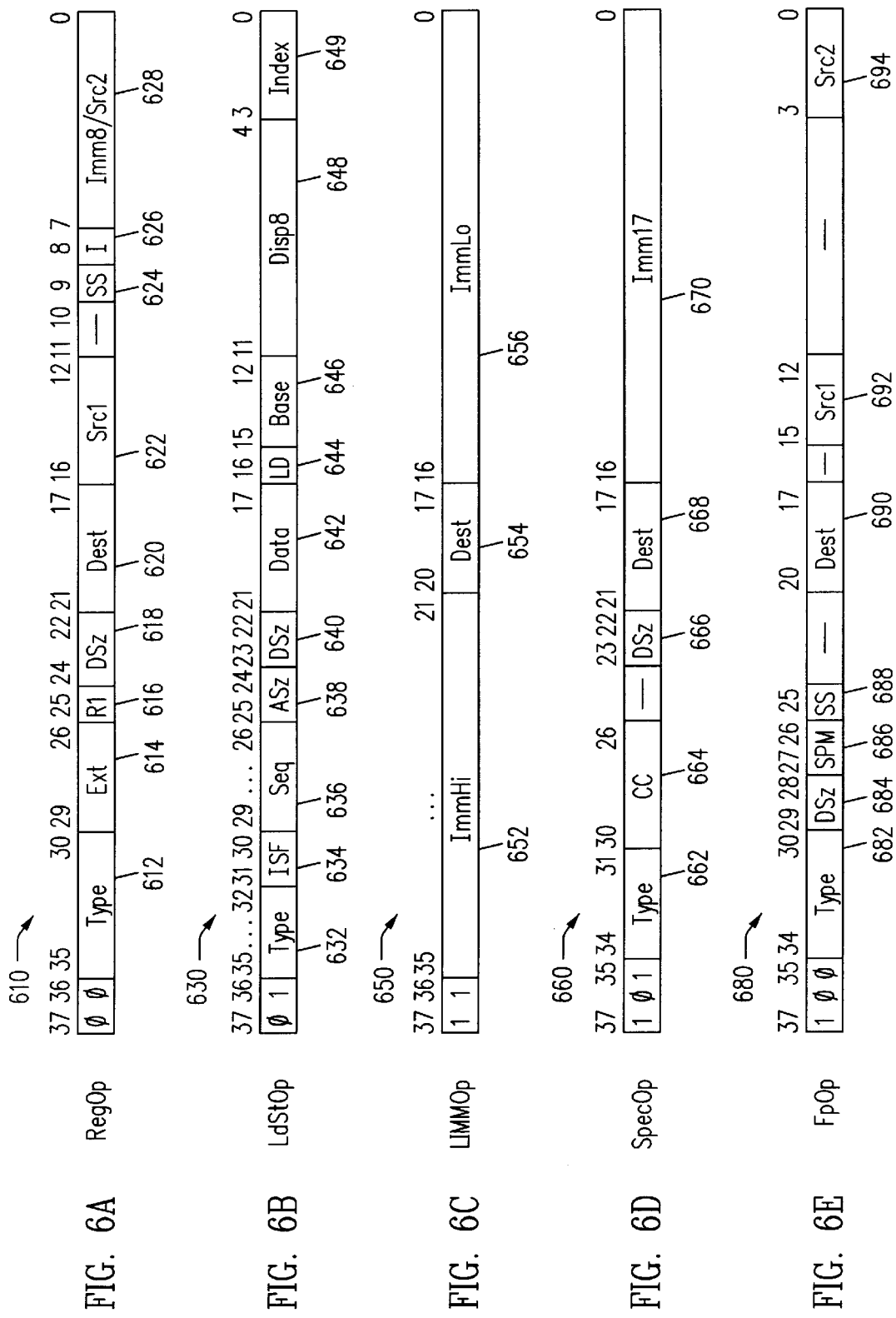
FIGS. 6A through 6E are pictorial illustrations showing a plurality of operation (Op) formats generated by the instruction decoder shown in FIG. 4.

Referring to FIG. 5, a schematic block diagram depicts an instruction decoder emulation circuit 231 including an instruction register 512, an entry point circuit 514, an emulation code sequencer 510, an emulation code memory 520 and an Op substitution circuit 522. The instruction decoder emulation circuit 231 is a circuit within the instruction decoder 220. The instruction decoder emulation circuit 231 receives instruction bytes and associated predecode information from the instruction buffer 408 connected to the instruction fetch control circuit 218, the BTB 456 or the instruction cache 214. The instruction buffer 408 is connected to and supplies the instruction register 512 with x86 instructions. The instruction register 512 is connected to the entry point circuit 514 to supply emulation code ROM entry points. The entry point circuit 514 receives the x86 instruction and, from the x86 instruction operation code (opcode), generates an entry point address, a beginning address pointing into the emulation code memory 520. In this manner an address of an instruction in emulation code memory 520 is synthesized from the opcode of an x86 instruction. The address is derived based on the x86 instruction byte, particularly the first and second bytes of the x86 instruction as well as information such as the mode/m byte, prefixes REP and REPE, the protected mode bit and effective data size bit DSz. Generally, closely related x86 instructions have similarly coded bit fields, for example a bit field indicative of instruction type is the same among related x86 instructions, so that a single entry in the emulation code memory 520 corresponds to several x86 instructions. Entry points are generally synthesized by reading the x86 instructions and assigning bits of the entry point address according to the values of particular x86 instruction bit fields. The instruction register 512 is connected to the emulation code sequencer 510 which, in turn, is connected to the emulation code memory 520. The emulation code sequencer 510 applies the entry point to the emulation code memory 520 and receives sequencing information from the emulation code memory 520. The emulation code sequencer 510 either controls the sequencing of instructions or, when a new sequence is to be started, applies an entry point to the emulation code memory 520. Operations (Ops) encoded in the emulation code memory 520 are output by the emulation code memory 520 to the Op substitution circuit 522 as Op quads or Op units. The Ops correspond to a template for RISC-type x86 operation. This template includes a plurality of fields into which codes are selectively substituted. The emulation code memory 520 is connected to the Op substitution circuit 522 to supply Ops into which the various Op fields are selectively substituted. Functionally, the entry point circuit 514 calculates an entry point into the emulation code ROM 232 or emulation code RAM 236. The sequence in emulation code ROM 232 determines the functionality of an instruction.

The emulation code memory 520 includes an on-chip emulation code ROM 232 and an external emulation code RAM 236. The emulation code memory 520 includes encoded operations that direct how the processor 120 functions and defines how x86 instructions are executed. Both the emulation code ROM 232 and RAM 236 include a plurality of operation (Op) instruction encodings having a Op coding format that is the same in ROM 232 and RAM 236. For example, in one embodiment the emulation code ROM 232 has a capacity of 4K 64-bit words. The Op coding format is typically a format defined in 30 to 40-bits for example. In one embodiment, a 38-bit format, shown in FIGS. 6A through 6E, is defined. The emulation code ROM 232 base address location within the emulation space is fixed. The external emulation code RAM 236 is resident in standard memory address space within cacheable memory. The emulation code RAM 236 base address location within the emulation space is fixed. The 32-bit emulation code RAM 236 address is formed by the fixed base address of the emulation code RAM 236 which supplies bits the most significant fifteen bits <31:17>, and the Op address which furnishes fourteen bits <16:3> concatenated to the base address its. The two least significant bits <1:0> of the emulation code RAM address are set to zero. The fourteen bit Op address in emulation code RAM 236 is the same as the Op address in emulation code ROM 232. Operations (Ops) are stored in Op coding format, for example 38-bits, in the external emulation code RAM 236 in 64-bit words. Bits in excess of the Op coding format bits of the 64-bit words are used to store control transfer (OpSeq) information. The external emulation code RAM 236 is typically used for test and debug purposes, allowing for patching of any instruction encoded in the emulation code ROM 232, and for implementing special functions such as system management mode (SMM). For example, if an instruction in emulation code ROM 232 is found to function improperly, the external emulation code RAM 236 is accessed to temporarily or permanently substitute for the improperly-functioning fixed code in the emulation code ROM 232. Access to the external emulation code RAM 236 is typically gained using one of two techniques. In a first technique, a one-bit field in an OpSeq field of an element of emulation code memory 520 designates that the next address for fetching instructions is located in external emulation code RAM 236. In this first technique, the on-chip emulation code ROM 232 initiates execution of the external emulation code RAM 236. In a second technique, a vector address is simply supplied for vectoring to an entry point in the emulation code RAM 236.

The instruction cache 214, instruction fetch control circuit 218 and instruction decoder 220 function in three instruction fetch and decode modes. In a first mode, the instruction decoder 220 fetches emulation code Op quads from the on-chip emulation code ROM 232. Each Op quad includes four operations (Ops) plus control transfer information (OpSeq) for determining the next cycle of fetch and decode function. In a second mode, the instruction fetch control circuit 218 controls fetching of x86 macroinstruction bytes from the instruction cache 214, which is part of the on-chip L1 instruction cache 214. The x86 macroinstructions are decoded by the macroinstruction decoder 230, which generates four operations (Ops). Four Ops plus the OpSeq field form a full Op quad. The instruction decoder 220 performs any coded control transfers using the branch predict logic 234 and vectoring functionality of the macroinstruction decoder 230. In a third mode, the instruction fetch control circuit 218 controls fetching of 64-bit words containing emulation code in Op coding format from the instruction cache 214, one 64-bit word per cycle. Each 64-bit word corresponds to a single operation (Op). In other embodiments, a plurality of 64-bit words may be accessed per cycle. An embodiment in which four 64-bit words are accessed, the emulation code RAM 236 supplies a full Op quad in the manner of the on-chip emulation code ROM 232 so that a fully-reprogrammable processor with full efficiency is achieved. A fully-reprogrammable processor advantageously permits soft implementation of greatly differing processors, for example an x86 processor and a PowerPC™ in a single hardware.

Figure 7:
FIG. 7 is a pictorial depiction of an OpSeq field format employed in the emulation code memory shown in FIG. 5.

In the first and third operating three modes, control transfer information is formatted into an operation sequencing (Opseq) field of the Op quad. Unconditional control transfers, such as branch (BR) and return from emulation (ERET) operations, are controlled completely using the Opseq control transfer information. Conditional transfers, such as branch on condition (BRcc), are controlled using a combination of the Opseq field and a branch condition (BRCOND) operation. An OpSeq field format graphic is shown in FIG. 7. The 16-bit OpSeq field 700 includes a two-bit sequencing action (ACT) field 710, a single-bit external encode field 712 and a 13-bit operation (Op) address field 714. Four sequencing actions in the ACT field 710 are encoded, as follows:

| ACT | Operation | Description |
| --- | --- | --- |
| 0 0 | BR/BRcc | uncond/cond branch to encode address |
| 0 1 | BSR/BSRcc | uncond/cond "call" to encode address |
| 1 0 | ERET/ERETcc | return from emulation to instr decoding |
| 1 1 | SRET/SRETcc | return from emulation call |

Whether a sequencing action of an OpSeq is unconditional or conditional depends on the presence or absence, respectively, of a branch condition (BRCOND) Op elsewhere within the Op quad. The BRCOND Op within the Op quad specifies the condition to be tested and the alternate emulation code target address. No explicit static branch direction prediction bit exists. Instead the predicted action and next address are always specified by the OpSeq field 700 and the "not predicted" next address is always specified by the BRCOND Op. A BRCOND Op is always paired with a BSR sequencing action including unconditional calls. For unconditional and conditional "predicted-taken" calls, the BRCOND Op specifies the return address to be saved.

The external encode field 712 is set to one if emulation code to be executed is located in external emulation code RAM 236. The external encode field 712 is set to zero if emulation code to be executed is located in internal emulation code ROM 232. The Op address field 714 designates an address of a target Op within a non-entry point Op quad.

The Opseq control transfer information controls unconditional control transfers when an Op quad or 64-bit memory word is fetched and arranged or "instantaneously decoded". Designation of the next instruction to be decoded is controlled by the Opseq field alone. The Opseq field specifies one of three alternative actions. First, the Opseq field directs fetching of emulation code from emulation code ROM 232 at a specified 14-bit single operation word address so that an emulation code ROM 232 Op quad is fetched. Second, the Opseq field directs fetching of emulation code from emulation code RAM 236 at a specified 14-bit single operation word address so that an emulation code RAM 232 64-bit memory word is fetched. Third, the Opseq field includes a return from emulation (ERET) directive, which directs the instruction decoder 230 to return to x86 microinstruction decoding.

Emulation code fetched from the emulation code ROM 232 is fetched in the form of aligned Op quads. A branch to an intermediate location within an Op quad causes the preceding operations within the Op quad to be treated as invalid by fetching NOOPs in place of the preceding operations.

The byte memory addresses for fetching 64-bit memory words from emulation code RAM 236 are created by concatenating a specified 14-bit operation address with three least significant bits set to zero, thereby creating an aligned 8-bit address. The byte memory addresses for fetching 64-bit memory words are 8-bit aligned, thus rendering memory Op decoding and fetch/decode advancement consistent and simple.

The Opseq control transfer information also controls designation of the immediate next instruction to be decoded for conditional control transfers. The branch condition (BRCOND) operation specifies the condition code to be tested and evaluated and specifies an alternative 14-bit emulation code fetch and decode address. Thus, Opseq control transfer information for conditional control transfers effectively specifies the predicted path of the conditional branch. The BRCOND address typically is either the 14-bit target Op word address or the 14-bit Op word address of the next "sequential" operation (Op). More generally, the BRCOND address may specify a fully general two-way conditional branch. Note that the word sequential is placed in quotation marks to indicate that, although the "sequential" address generally points to an instruction which immediately precedes the present instruction, the "sequential" address may be set to any addressed location. A conditional ERET operation is implemented by setting the Opseq field to specify an ERET operation so that the conditional ERET is predicted taken. If the ERET operation is subsequently found to be mispredicted, then the x86 macroinstruction stream directed by the ERET is aborted and the sequential macroinstruction stream specified by the BRCOND operation is restarted.

BRCOND operations are loaded into the scheduler 260 in an unissued state. BRCOND operations are evaluated in-order by the branch resolution unit of the scheduler 260. If the branch is properly predicted, the branch is marked Completed. Otherwise, the BRCOND state is left unissued and triggers a branch abort signal when detected by the Op commit unit.

The emulation code memory 520 supports a single-level (no nesting) subroutine functionality, in which an Opseq field is set to specify alternatives for fetching emulation code. The alternatives are structured as a typical two-way conditional branch, except that a 14-bit Op word address from the immediate field of a BRCOND Op within the Op quad or memory Op is loaded into a subroutine return address register. The subroutine return address register stores the 14-bit Op word address plus a single bit which designates whether the return address is located in emulation code ROM 232 or RAM 236. The condition code specified by the BRCOND Op may be any alternative, including TRUE, so that both unconditional and conditional (predicted-taken) subroutines may be specified. However, the BRCOND Op must be specified to avoid loading an undefined value into the subroutine return address register.

All emulation code subroutine support and return address register management is performed by the emulation code sequencer 510 at the front of the pipeline. Thus return address register loading and usage is fully synchronous with standard decoder timing so that no delays are introduced.

Two-Way Emulation Code Branching

The emulation code ROM 232 is storage for a plurality of sequences of operations (Ops). An operation sequence begins at a defined entry point that is hard-coded into the emulation code ROM 232 and extends to a return from emulation (ERET) Opseq directive that ends the operation sequence. The number of operations in a sequence is typically variable as is appropriate for performing various different functions. Some simple x86 instructions have only a single Op entry in the emulation code ROM 232, although these instructions are fetched with Op quad granularity. Other more complex x86 instructions use many component operations. The emulation code ROM 232 storage is structured as a plurality of Op quads, programmed into a fixed ROM address space. Each Op quad includes four RISC Op fields and one Opseq field. The operation sequences are typically not aligned within the Op quads so that, absent some technique for branching to interspersed locations in emulation code ROM 232, many ROM units in the emulation code ROM 232 are unusable, wasting valuable integrated circuit space. Furthermore, because the entry point address of an instruction in emulation code ROM 232 is synthesized from the opcode of an x86 instruction, the entry point addresses often are forced into fixed positions spread throughout the ROM address space with intervening gaps that lead to unused portions of ROM. ROM positions that are left without access via an entry point are free for other usage but are not conveniently sequential to allow access. The OpSeq field provides a technique for branching to these interspersed locations, thereby substantially eliminating wasted space.

Each of the four RISC Op fields of an Op quad stores a simple, RISC-like operation. The OpSeq field stores a control code that is communicated to the emulation code sequencer 510 and directs the emulation code sequencer 510 to branch to a next location in the emulation code ROM 232. Each of the four RISC Op fields in the emulation code ROM 232 may store a branch operation, either conditional or unconditional, and thereby specify a target address so that a plurality of branches may be encoded in a single Op quad. In some embodiments of the instruction decoder emulation circuit 231, the Op quad is limited to having at most a single branch operation to direct Op order in combination with the OpSeq field. The combination of a conditional branch Op in one of the four RISC Op fields and the OpSeq field in an Op quad yields an Op quad with two possible target or next addresses.

For an Op quad having a plurality of target addresses, the emulation code sequencer 510 directs the sequence of operations by selecting a hard-coded, predicted target address. Thus, for an Op quad including an conditional branch, the emulation code sequencer 510 selects a hardcoded OpSeq target address in preference over the conditional branch. The unconditional branch is subsequently handled in accordance with the branch prediction functionality of the processor 120 so that no additional branch handling overhead is incurred by implementing two-way emulation code branching.

The OpSeq field is advantageously used to efficiently fit Op sequences into nonused locations in the emulation code ROM 232. This usage of the OpSeq field to branch to a target address advantageously achieves unconditional branching without incurring a time or cycle penalty.

Figure 8:
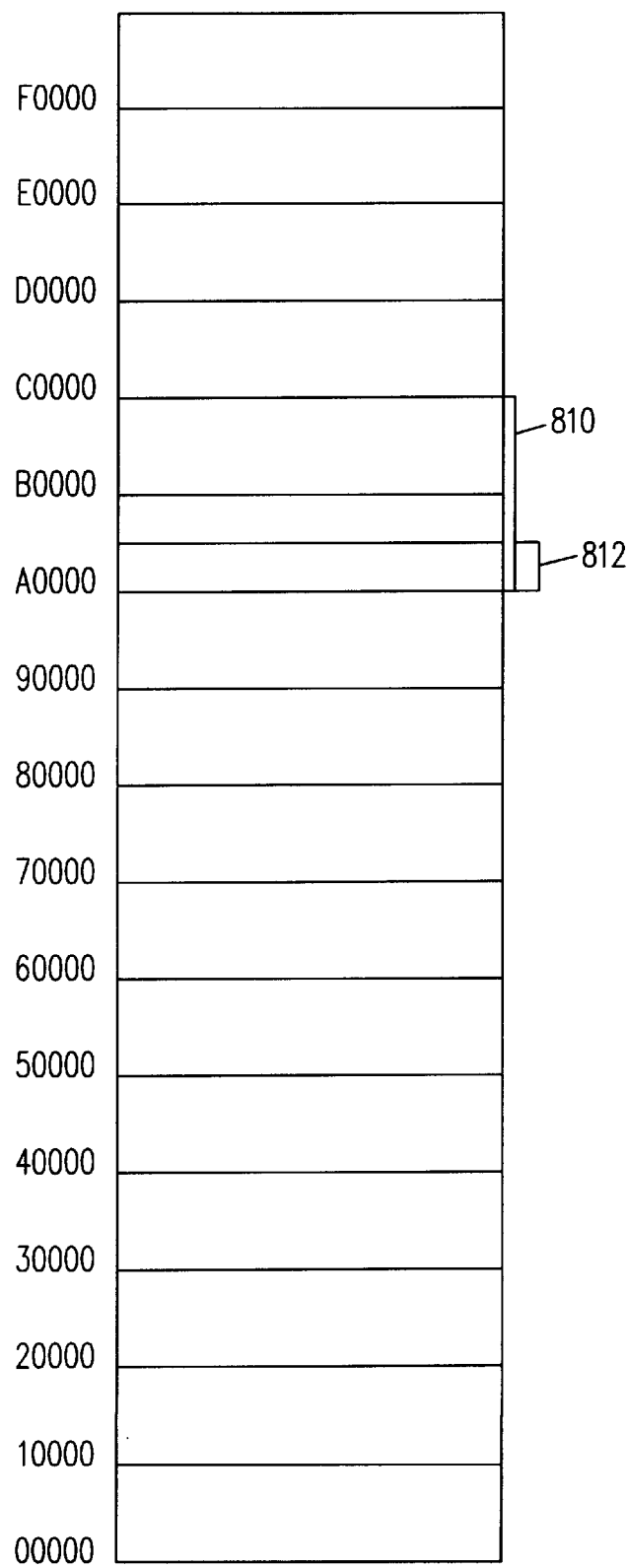
FIG. 8 is a memory map which illustrates processor memory assignments including assignment of a separate system management RAM (SMRAM) area.

A memory map shown in FIG. 8 illustrates processor 120 memory assignments, including assignment of a separate system management RAM (SMRAM) area. The system management mode also uses memory in DRAM main memory that underlies the SMRAM at SMRAM area addresses. In the illustrative embodiment, SMRAM is positioned at memory addresses A0000H-BFFFFH. These addresses are normally accessible only while operating in SMM. The SMRAM area is cacheable both in the instruction cache and the data cache. Cache consistency is maintained without flushing. SMM software 810, including SMM instructions and SMM data, resides at a predefined location within the A0000H to BFFFFH area of address space and physically resides in main memory mapped to this region. During normal system operation, a main memory controller is configured to respond only to SMM accesses within the portion of the A0000H to BFFFFH memory locations that specifically holds SMM software. These locations are called an SMRAM memory locations 812. Non-SMM accesses of SMRAM 812 fall through to underlying hardware, for example, to a video memory. For other non-SMRAM portions of the A0000H to BFFFFH region, the main memory controller is configured as standard memory with no underlying memory or hardware at the SMRAM addresses. BIOS code furnishes support for allowing non-SMM software access to SMRAM, typically by a BIOS code which functions at boot time to initialize SMRAM. BIOS code also enables access by SMM software to the hardware or memory overlaid by the SMRAM portion of address space.

BIOS includes programmed support for SMRAM initialization at boot time.

Figure 9:
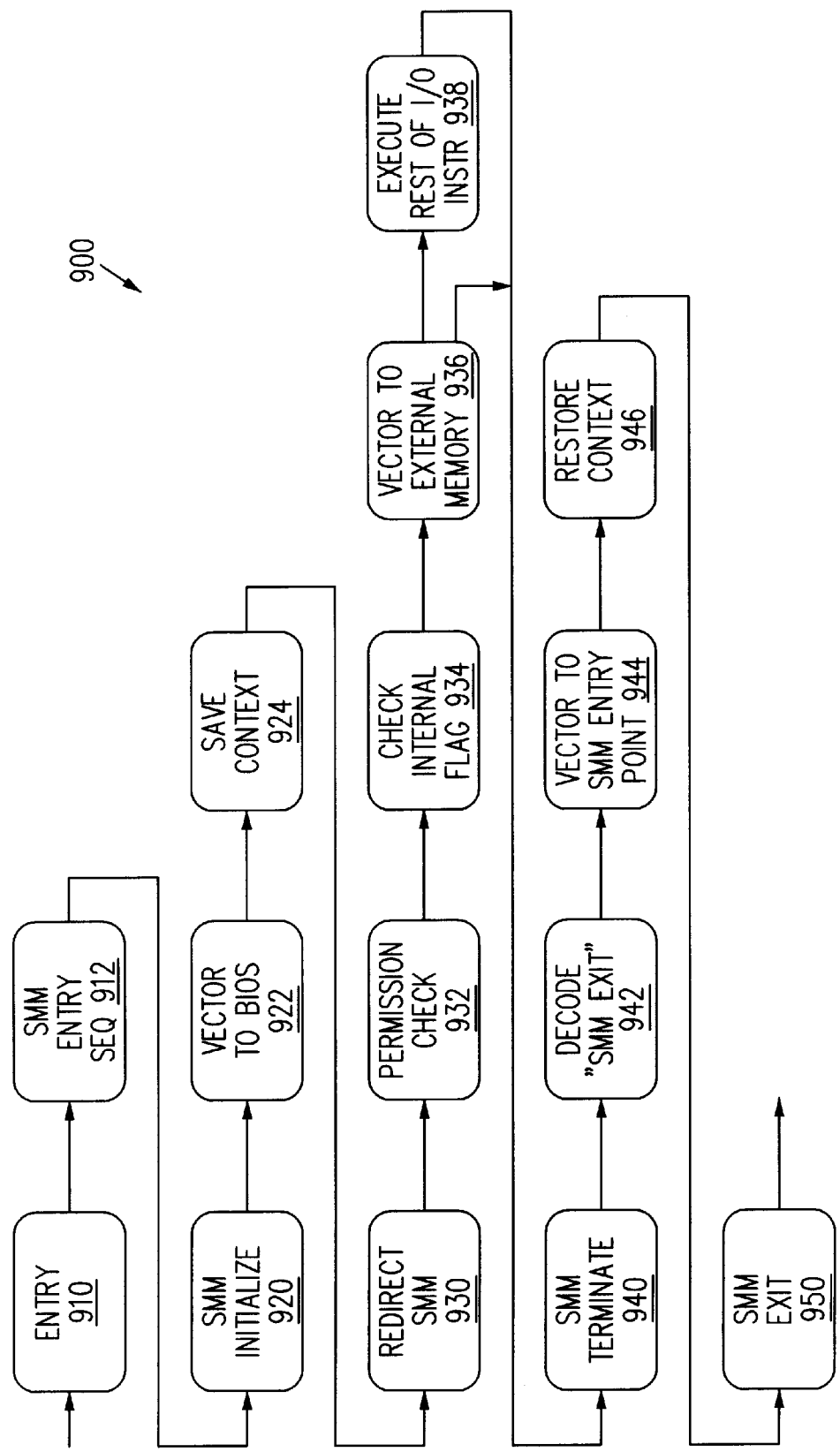
FIG. 9 is a flowchart which illustrates system management mode (SMM) functionality.

Referring to FIG. 9, a flowchart which illustrates SMM functionality is shown. SMM 900 is a processor operating mode that is distinct and substantially different from other modes including real, V86 and protected modes. Entry 910 into system management mode (SMM) is attained by one three methods, including assertion of a signal on a system management interrupt (SMI) interrupt pin, a call by a special SMM software instruction and the occurrence of an I/O access trap. I/O access trapping is activated on the basis of special I/O bitmap or I/O trap address ranges so that no hardware support, such as connection to the SMI pin, is necessary. While SMM 900 is active, all x86 architectural features and instructions are available for use in addition to a set of SMM support instructions. A typical SMM embodiment is defined within a 16-bit environment which is similar to a real mode environment. However, the SMM environment definition is a soft definition which is completely adaptable and designated by the information set up or initialized by a RISC SMM entry sequence which begins in step 912. SMM software has three main functional routines including an SMM initialization routine 920, a routine for redirecting SMM operations to external memory 930 and an SMM termination routine 940.

The SMM initialization routine 920 is activated upon an SMI signal, a SMM software instruction call or an I/O access trap. Upon recognition of an activating signal, the processor 120 vectors to a RISC instruction in the BIOS area of address space in step 922. In an SMM initialization step 924, the processor 120 may save the current x86 state and/or a suitable extended instruction pointer (EIP) if desired, set up or initialize a new x86 operating state including specifying the SMM operating mode, setting a SMM microarchitecture control register bit (see SMM control register 1038 shown in FIG. 10), and jump to an x86 SMM handler code which is located at a specified location in the A0000H to BFFFFH address area. Essentially any type of SMM entry functionality is allowed and implemented.

SMM operation redirecting routine 930 begins with permission check step 932 which determines whether an I/O access is allowed using an x86 I/O instruction. When the processor 120 successfully completes the permission steps so that an I/O access is allowed to be performed, the processor then checks an internal SMMVectorIO flag in step 934. If this flag is set, in step 936 the processor 120 vectors to an external RISC entry point, which is located in the BIOS area of address space A0000H to BFFFFH but is at a location different from the "SMM entry" entrypoint. If the flag is not set, the processor 120 executes the remainder of the x86 I/O instruction in step 938. Vectoring step 936 allows all I/O accesses to be monitored and selectively trapped to SMM handler software. In one embodiment, I/O access monitoring is based, for example, on an I/O address bitmap or on a comparison with a set of I/O address ranges. The SMM operation redirecting routine 930 furnishes a generally-applicable redirection functionality which is applicable to specific operations, such as implementation of a peripheral activity counter emulation and shadowing of write-only I/O ports, that would conventionally require logic in a system chipset.

The SMM termination routine 940 is activated when the processor 120 decodes an x86 "SMM exit" instruction, in one embodiment for example an x86 opcode "0F AA" in step 942. In step 944, the processor 120 vectors to an SMM exit entry point in external RISC memory. In some embodiments, the RISC code at the SMM exit entry point implements a conventional SMM exit procedure. Alternatively, the SMM exit RISC code implements multiple SMM functions controlled by a parameter passed in a general register or as an immediate value following the opcode byte. In embodiments having a control parameter passed as an immediate value, one argument or function number defines the SMM exit operation, while other function numbers specify x86 instructions for saving and restoring an x86 state variable such as a segment register including a cached descriptor. Virtually any set of SMM x86 instructions may be defined and implemented and usage of these individual instructions may be restricted, as desired. For example, special SMM x86 instructions may be defined so that most instructions are executable only while operating in SMM, but certain instructions, such as a software SMI instruction, is also executable by normal software, software operating at the current privilege level (CPL=0) of a currently active program, outside of SMM.

In step 946, the processor 120 restores the x86 state that was saved at entry to SMM, re-establishing the operating mode of the restored x86 state, clears the SMM control register bit and jumps back to execution at a suitable instruction pointer (EIP) location, such as an EIP saved by the SMM entry code.

The SMM 900 is terminated by an exit step 950.

Figure 10:
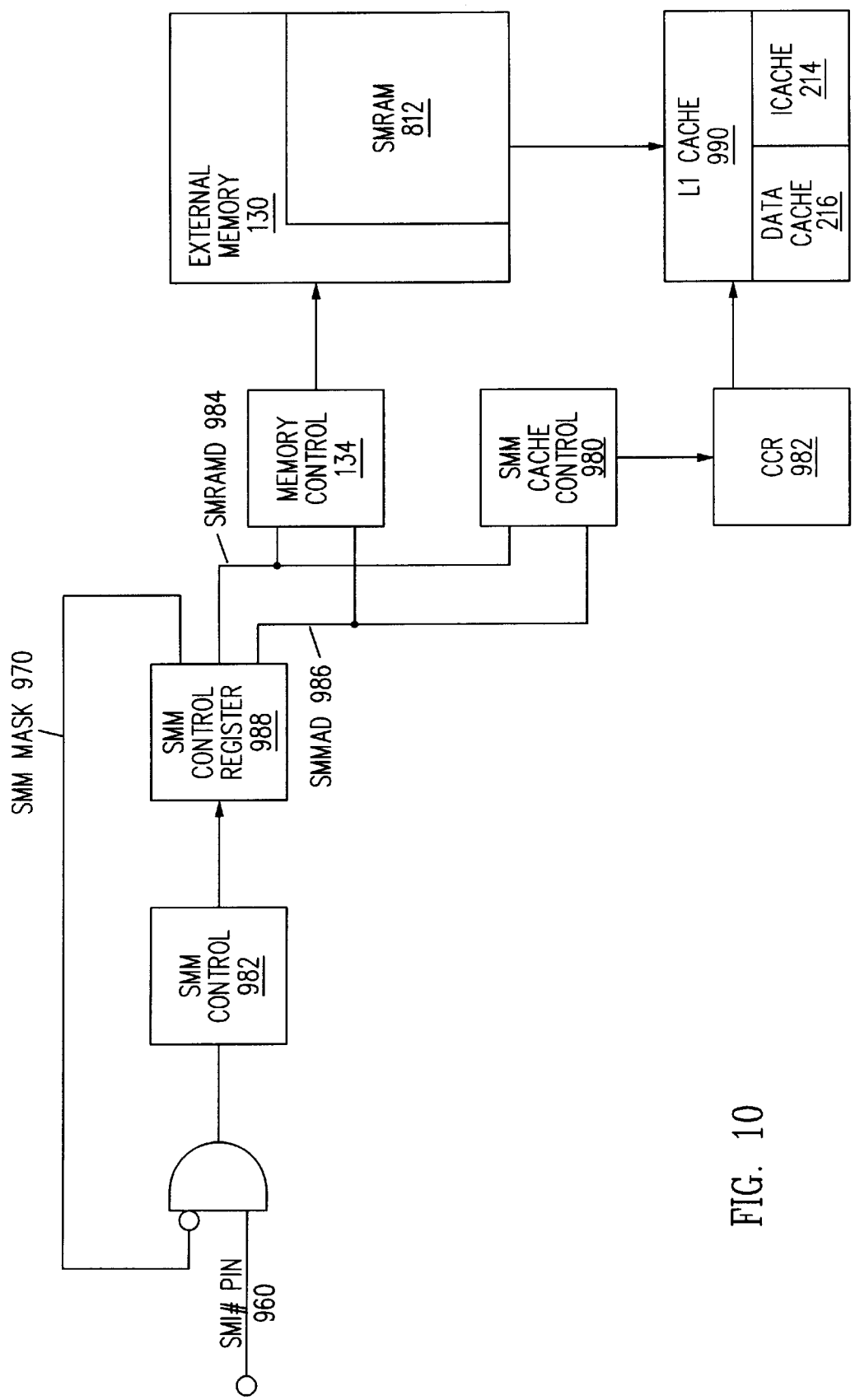
FIG. 10 is a schematic block diagram which illustrates various SMM structures implemented in processor circuits.

Referring to FIG. 10, a schematic block diagram illustrates various details of SMM functionality implemented in processor 120 circuits. A system management interrupt (SMI) is indicated by a signal on an SMI# pin 960. The SMI# pin 960 is level-sensitive, active low, 5 V tolerant and asynchronous. SMI# pin 960 is synchronized and delighted on the processor 120 chip. Logically, SMI# 960 is a high priority interrupt that is recognized at x86 instruction boundaries. The SMI interrupt has a higher priority than INTR, NMI and ResetCPU interrupts. The SMI interrupt is recognized between iterations of REP string instructions. The SMI interrupt is recognized even in a Halt state. The SMI interrupt is not recognized during a shutdown state.

A SMM mask 970 furnishes interrupt masking while the processor 120 is in SMM, as indicated by an asserted SMM control register bit 988. Specifically, SMM mask 970 masks recognition of pending NMI, ResetCPU and SMI interrupts. Recognition of a pending INTR interrupt is controlled by the EFlags IF bit, which typically is cleared during SMM entry. Masked interrupts become recognizable immediately after "SMM exit". The original IF bit is restored during "SMM exit".

The memory controller 124 controls SMM bus transactions. While the processor 120 is operating in SMM, all external bus transactions within the A0000H to BFFFFH area of address space are marked as SMM accesses. In particular, a system management mode (SMM) address (SMMAD) bit 986 is communicated on the 64-bit multiplexed address/data (IAD) bus (not shown) during the address phase of all bus transactions identified as SMM accesses. Normally, for all transactions, the SMMAD bit 986 is deasserted with a value of one. However, when a memory transaction to an address in the range A0000H to BFFFFH is initiated, the SMMAD bit 986 is asserted with a value of zero. Whether or not the processor 120 is in SMM, all bus transactions to addresses outside of the A0000H through BFFFFH range have a deasserted SMMAD bit 986.

The memory controller 124 is configured to respond to SMM and/or non-SMM accesses to the area of main memory that is used for SMRAM 812. During initialization of SMRAM 812, the memory controller 124 is configured to respond to non-SMM accesses to SMRAM 812. After the memory controller 124 is configured, the memory controller 124 is reconfigured to respond to SMM accesses and no longer to non-SMM accesses. In some embodiments, off-chip circuitry provides a configuration lock mechanism (not shown) that prevents subsequent modification of these bits by non-SMM software.

An SMM caching controller 980 controls caching of SMM instructions and data while automatically maintaining cache consistency. Various embodiments of the SMM caching controller 980 employ various schemes in which on-chip cacheability control registers (CCRs) 982 are used to control cacheability of the SMRAM 812 region of address space. In another embodiment, the SMRAM 812 is simply marked as noncacheable.

In one embodiment of the SMM caching controller 980, the SMRAM address region is flushed from the processor 120 caches during the SMM entry instruction sequence and the SMM exit instruction sequence.

In a second embodiment of the SMM caching controller 980, caching of the SMRAM 812 address region is enabled by setting appropriate bits in the CCRs 982 during the SMM entry instruction sequence and disabled by alternatively setting appropriate bits in the CCRs 982 during the SMM exit instruction sequence. Advantageously, the overhead of cache flushing is avoided and SMRAM 812 is cacheable during SMM. Outside of SMM the processor caches are bypassed and ignored, causing all non-SMM accesses to go to the hardware underlying SMRAM 812, while leaving cached SMRAM lines resident in the cache. One complication of the second embodiment is the possibility of "dirty" SMRAM lines (modified data in the cache that does not match data in main memory) being replaced and written back to main memory outside of SMM, therefore with a deasserted SMMAD bit 986. To avoid this complication, caching of all SMRAM 812 memory is forced into a write-through mode. More specifically, while the SMM control register is set, the state of all new cache lines is forced to be shared instead of exclusive or modified.

A micro-architecture control register (SMRAMD) bit 984 is furnished to override or inhibit the assertion of the SMMAD bit 986 for data access-related SMM bus transactions. Accordingly, access to hardware underlying SMRAM is achieved. All bus transactions to memory during SMM and within the address ranges A0000H and BFFFFH, by default, take place with the SMMAD bit 986 asserted. The SMRAMD bit 984 enables access by SMM code to the hardware underlying SMRAM 812. Assertion of SMMAD 986 for code access-related bus transactions within the A0000H through BFFFFH address range is dependent only upon the setting of the SMM control register bit 988. Assertion of SMMAD 986 for data access-related bus transactions within the address range A0000H through BFFFFH is dependent on both the SMM and SMRAMD bits. Typically, both the SMM and SMRAMD bits are set during SMM entry and both bits are cleared during SMM exit. During SMM, when SMM software is to perform one or more data accesses to the hardware underlying SMRAM 812, the SMM software clears the SMRAMD bit 982, performs accesses to the hardware underlying SMRAM 812, and then set the SMRAMD bit 982. To avoid accidentally accessing cache entries with the same addresses as the accesses to hardware underlying SMRAM, cacheability of the corresponding area of SMRAM 812 is temporarily disabled. Accesses to memory outside of the address range A0000H through BFFFFH are allowable during the accessing of hardware underlying SMRAM and are processed in a conventional manner.

System Embodiments

Figure 11:
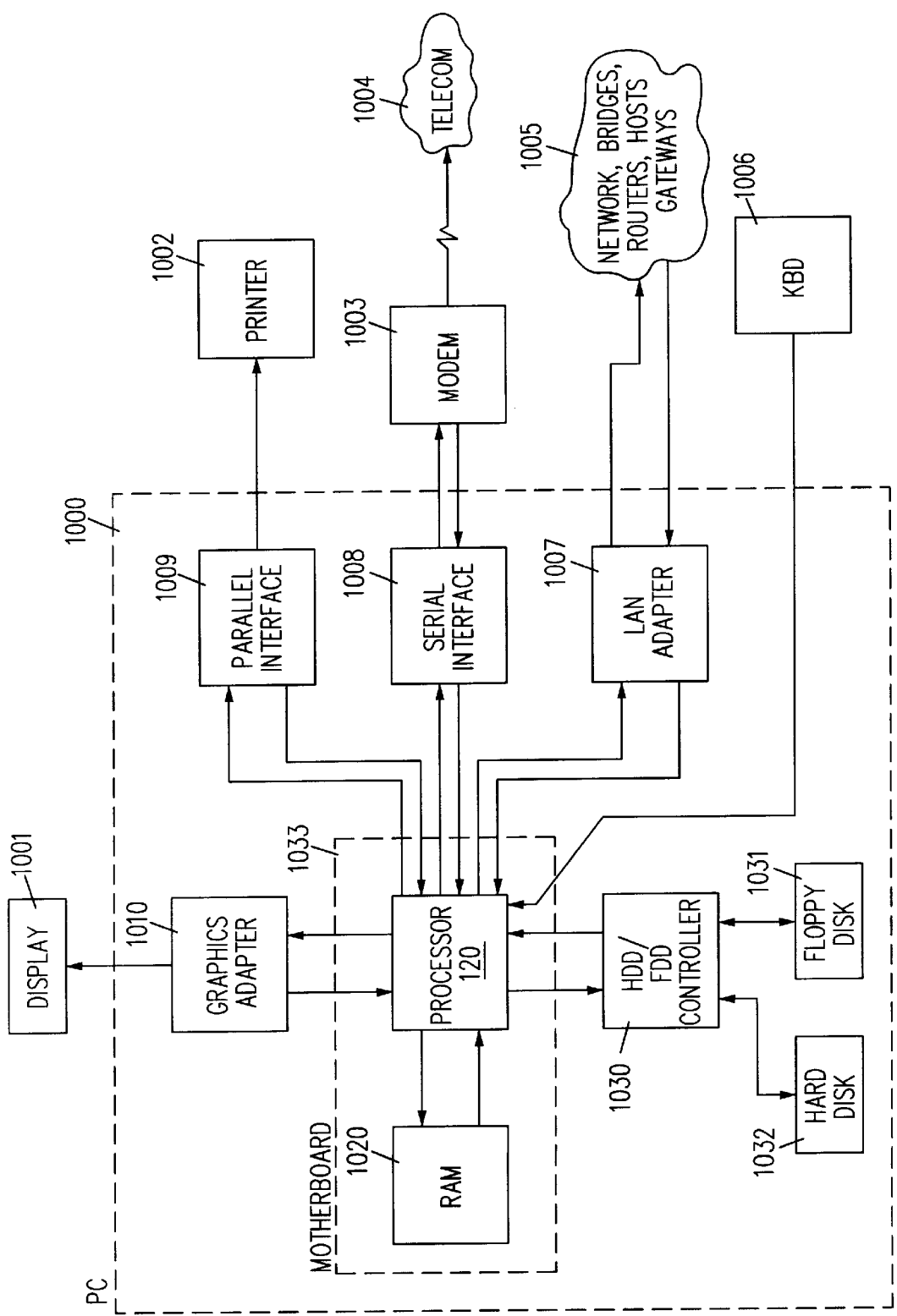
FIG. 11 is a block diagram of a personal computer incorporating a processor having an instruction decoder which implements an adaptable system management mode (SMM) in accordance with an embodiment of the present invention.
Figure 12:
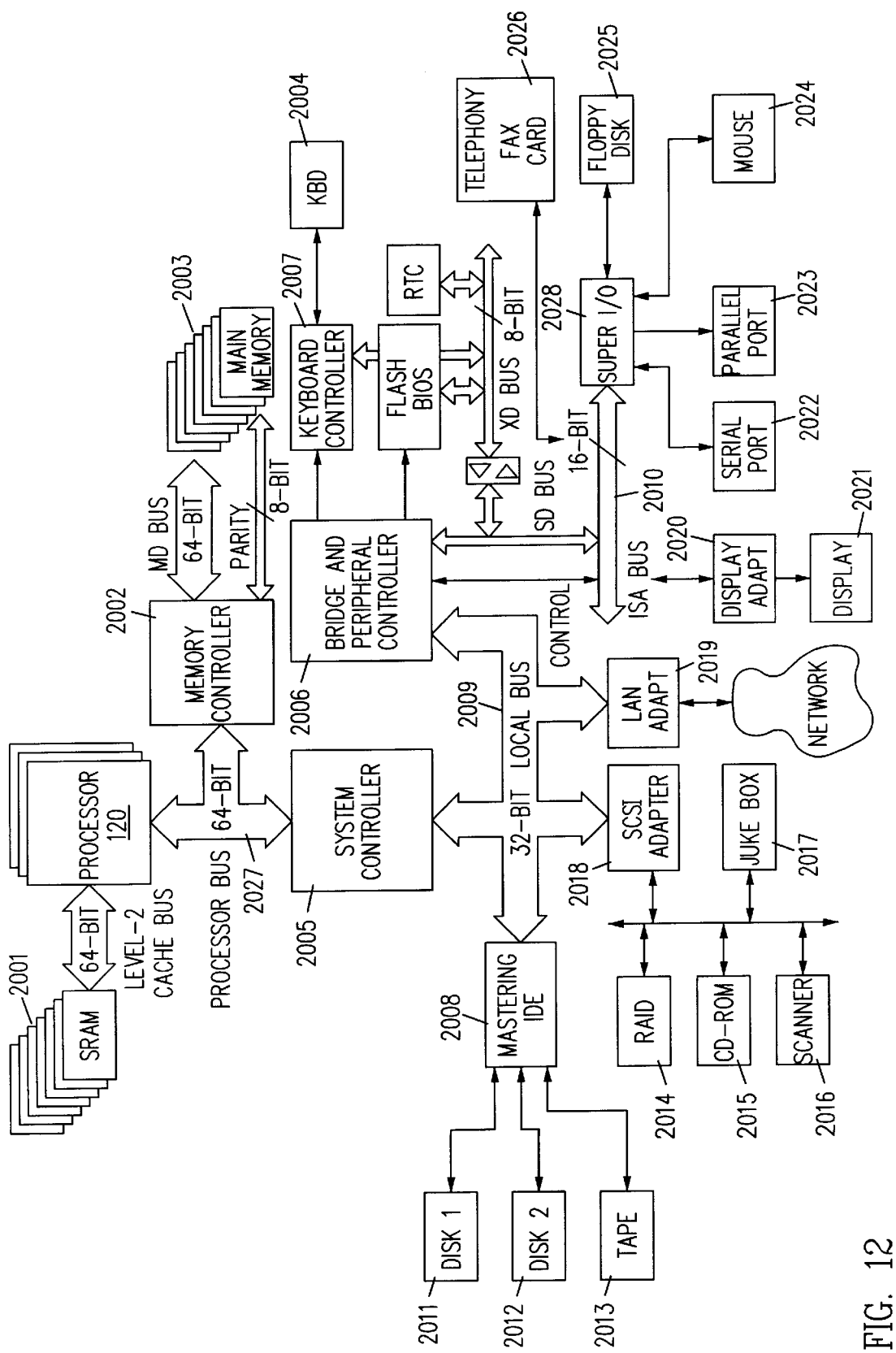
FIG. 12 is a block diagram of a networked server computer incorporating a processor having an instruction decoder which implements an adaptable system management mode (SMM) in accordance with an embodiment of the present invention.
Figure 13:
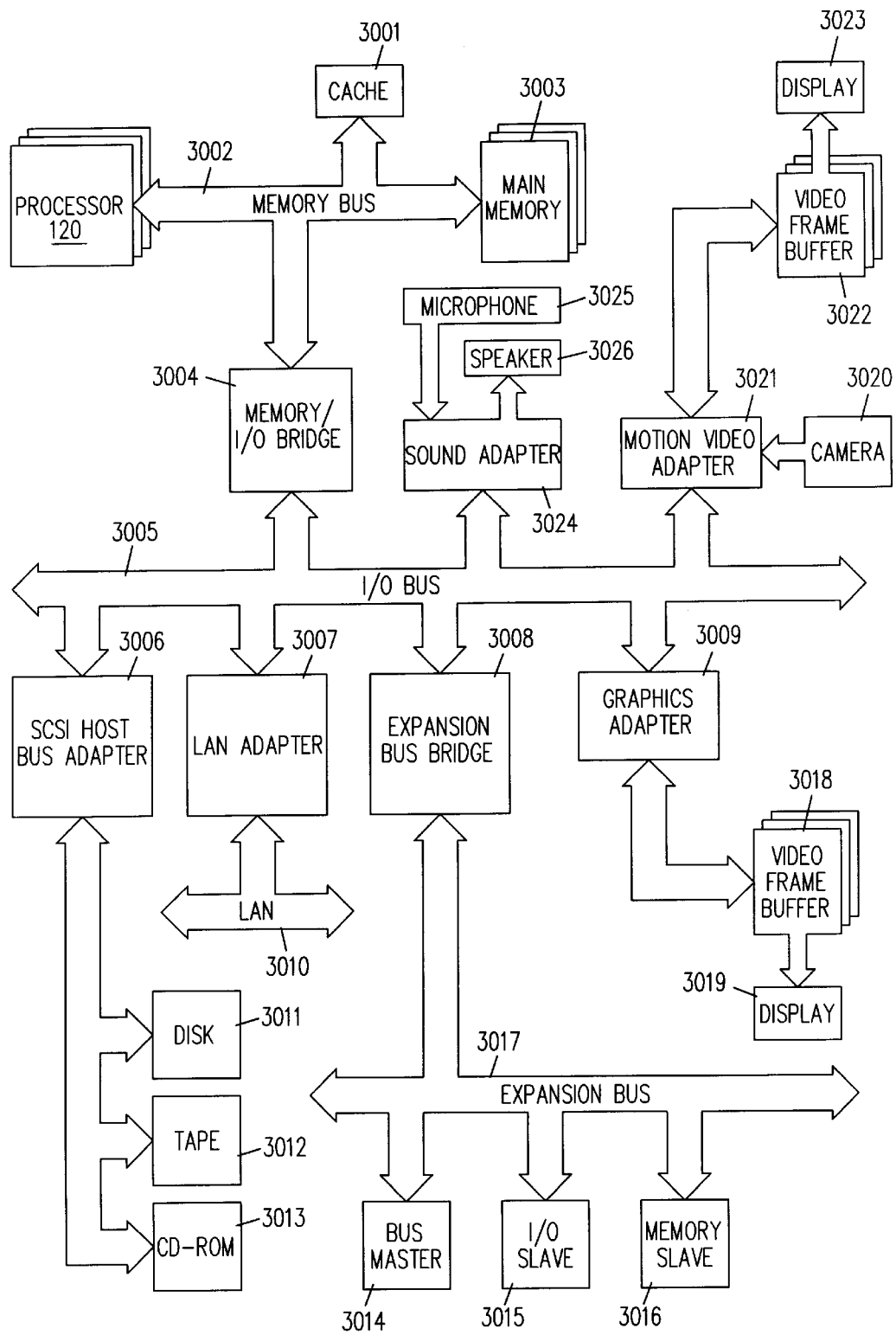
FIG. 13 is a block diagram of a multimedia computer incorporating a processor having an instruction decoder which implements an adaptable system management mode (SMM) in accordance with an embodiment of the present invention.

Superscalar processor 120 may be incorporated into a wide variety of system configurations, illustratively into standalone and networked personal computer systems, workstation systems, multimedia systems, network server systems, multiprocessor systems, embedded systems, integrated telephony systems, video conferencing systems, etc. FIGS. 11–13 depict an illustrative set of suitable system configurations for a processor, such as superscalar processor 120, that has an instruction decoder which implements an adaptable system management mode (SMM). In particular, FIGS. 11–13 depict suitable combinations of a superscalar processor having an instruction decoder that implements an adaptable system management mode (SMM) with suitable bus configurations, memory hierarchies and cache configurations, I/O interfaces, controllers, devices, and peripheral components.

The set of system configurations depicted in FIGS. 11–13 is merely illustrative and alternate combinations of bus configurations, memory hierarchies, I/O interfaces, controllers, devices, and peripheral components are also suitable. For example, suitable configurations for a system incorporating superscalar processor 120 include combinations of components, cards, interfaces, and devices such as:

1. video display devices, monitors, flat-panel displays, and touch screens;
2. pointing devices and keyboards;
3. coprocessors, floating point processors, graphics processors, I/O controllers, and UARTs;
4. secondary and tertiary storage devices, controllers, and interfaces, caches, RAM, ROM, flash memory, static RAM, dynamic RAM
5. CD-ROMs, fixed disks, removable media storage devices, floppy disks, WORMs, IDE controllers, enhanced-IDE controllers, SCSI devices, scanners and jukeboxes;
6. PCMCIA interfaces and devices, ISA busses and devices, EISA busses and devices, PCI local busses and devices, VESA local busses and devices, Micro Channel Architecture busses and devices;
7. network interfaces, adapters and cards such as for ethernet, token ring, 10Base-T, twisted pairs, untwisted pairs, ATM networks, frame-relay, ISDN, etc;
8. video cards and devices, 2-D and 3-D graphics cards, frame buffers, MPEG/JPEG compression/decompression logic and devices, videoconferencing cards and devices, and video cameras and frame capture devices;

9. computer integrated telephony cards and devices, modem cards and devices, fax cards and devices;
10. sound cards and devices, audio and video input devices, microphones, and speakers;
11. data acquisition and control cards and interfaces, compression/decompression logic and devices, encryption/decryption logic and devices; and
12. tape backup units, redundant/fault tolerant components and devices such as RAID and ECC memory.

Suitable combinations of such components, cards, interfaces, and devices (including those enumerated above as well as comparable components, cards, interfaces, and devices) are too numerous to list. However, those skilled in the art will appreciate the full set of suitable combinations and will recognize suitable couplings between such components, cards, interfaces, and devices.

FIGS. 11–13 are illustrative of an exemplary subset of the full set of suitable combinations.

A networked personal computer incorporating superscalar processor 120 is shown in FIG. 11. Superscalar processor 120 is connected to memory subsystem 1020. In the embodiment of FIG. 11, memory subsystem 1020 is shown as RAM, although alternative embodiments include a cache or caches interposed between the RAM and superscalar processor 120. Control logic and storage for such a cache may be distributed among the memory subsystem 1020 and the superscalar processor 120. For example, the level 1 caches (i.e., instruction cache 214 and data cache 216) and cache control logic 160 may be included in superscalar processor 120 as shown in FIG. 2 and the level 2 cache may be included as part of memory subsystem 1020. Alternative distributions are also suitable, although the level 1 caches are preferably on-chip with the out-of-order execution engine 222 (see FIG. 2) of superscalar processor 120.

In the embodiment shown in FIG. 11, superscalar processor 120 and memory subsystem 1020 are included as parts of motherboard 1033. A series of adapters, interfaces and controllers couple the processor to devices and peripheral components. These adapters, interfaces and controllers are typically be connected to the processor as cards in a backplane bus of motherboard 1033. However, alternative embodiments may incorporate individual adapters, interfaces and controllers into motherboard 1033. For example, graphics adapter 1010 may be included on motherboard 1033 with superscalar processor 120. In either case, graphics adapter is connected to superscalar processor 120 via busses such as those described below with reference to FIGS. 12 and 13. Graphics adapter 1010 drives signals to control display 1001 in accordance with screen updates supplied by superscalar processor 120. Parallel interface 1009 and serial interface 1008 provide parallel port and serial port signaling interfaces for respectively interfacing to parallel port devices (e.g., printers such as parallel printer 1002, tape backup units, etc.) and to serial devices (e.g., modem 1003, pointing devices, and printers). In the embodiment shown in FIG. 11, parallel interface 1009 and serial interface 1008 are shown as separate interfaces although each is often incorporated with a hard disk/floppy disk controller (such as 1030) as a multifunction card. Hard disk/floppy disk controller 1030 controls access to the media of hard disk 1032 and to floppy disk 1031. Typically, hard disk/floppy disk controllers such as hard disk/floppy disk controller 1030 provide some level of buffering of reads and writes. Hard disk/floppy disk controller 1030 may also provide limited caching for data transfers to and from the disk media.

Suitable designs for graphics adapter 1010, parallel interface 1009, serial interface 1008, and hard disk/floppy disk controller 1030 are well known in the art. For example, implementations of graphics adapter cards conforming to the VGA standard are commonly available and suitable designs are well known to those skilled in the art. Designs for parallel and serial interfaces, such as those conforming to the Centronics parallel interface and to the RS-232C serial interface specifications, respectively, are also well known to those skilled in the art. Similarly, designs for IDE and SCSI disk controllers are well known in the art and suitable implementations are commonly available. In each case, graphics adapter 1010, parallel interface 1009, serial interface 1008, and hard disk/floppy disk controller 1030 are of any such suitable design.

Finally, LAN adapter 1007 provides a network interface to local area networks such as 802.3 ethernet, 10base-T, twisted pair, and token ring networks. As with the other adapters and interfaces, LAN adapter 1007 is typically connected to the processor as a card in the backplane bus of motherboard 1033. However, alternative embodiments may incorporate LAN adapter 1007 into motherboard 1033. Suitable cards and devices providing network interfaces are well known in the art and LAN adapter 1007 is any such suitable card or device.

Because of the high performance associated with its superscalar design, superscalar processor 120 is particularly attractive as the processor, or a one of multiple processors, in a network server configuration such as that shown in FIG. 12. In the network server configuration shown in FIG. 12, multiple instances of superscalar processor 120 are shown connected to a level 2 cache 2001 and to a processor bus 2027. In the embodiment shown in FIG. 12, superscalar processor 120 includes an on-board level 1 cache (i.e., instruction cache 214 and data cache 216) and level 2 cache control logic. The level 2 cache control logic (not shown) is connected to level 2 cache 2001 via a 64-bit cache bus. Alternate embodiments of superscalar processor 120, such as the embodiment shown in FIG. 2, may offload the functionality of level 2 cache control logic. In such an alternative embodiment, level 2 cache control logic may be interposed between superscalar processor 120 and level 2 cache 2001. In the context of bus structures presented in FIG. 12, level 2 cache control logic could be connected to superscalar processor 120 via processor bus 2027. Suitable modifications to the level 2 cache configuration shown in FIG. 12 will be apparent to those skilled in the art.

Referring again to FIG. 12, superscalar processor 120 is connected to a memory controller 2002 and to a system controller 2005 via a 64-bit processor bus 2027. Memory controller 2002 provides a 64-bit interface to memory 2003 including an 8-bit parity interface to support Error Correcting Codes (ECC). ECC memory is desirable, but optional, and alternative embodiments may forgo the parity interface. System controller 2005 provides the interface (or bridge) between the 64-bit processor bus 2027 and the 32-bit local bus 2009. Local bus 2009 is any high-speed I/O bus, for example, a VESA Local bus (VL bus) or Peripheral Component Interconnect (PCI) bus. System controller 2005 provides buffering to support the potentially disparate clock rates of processor bus 2027 and local bus 2009. System controller 2005 arbitrates for use of the two busses (2027 and 2009) and may, in certain configurations, support burst data transactions across the two busses. Suitable designs for interbus bridges, such as system controller 2005 (bridging processor bus 2027 and local bus 2009) and bridge and peripheral controller 2006 (bridging local bus 2009 and ISA bus 2010, as described below) are well known in the art. For example, U.S. Pat. No. 5,414,820, "Crossing Transfers for Maximizing the Effective Bandwith of a Dual-Bus Architecture," to McFarland et al., the entirety of which is incorporated herein by reference, describes a design suitable for bridging a high-speed system bus and a slower I/O bus. System controller 2005 and bridge and peripheral controller 2006 are of any such suitable design.

Local bus 2009 couples to multiple local bus devices and components (illustratively, to IDE controller 2008, SCSI Adapter 2018, LAN Adapter 2019, and bridge and peripheral controller 2006). Certain of the local bus devices and components on local bus 2009 may optionally be provided as cards connected to the local bus 2009 by a modular connector. In the embodiment shown in FIG. 12, IDE controller 2008, SCSI adapter 2018, and LAN adapter 2019 are provided as cards connected to the local bus 2009 by a modular connector. Bridge and peripheral controller 2006 is directly connected to the local bus 2009. Alternate configurations (including configurations in which one or more of the IDE controller 2008, SCSI adapter 2018, and LAN adapter 2019 are directly connected to local bus 2009) are also suitable and will be appreciated by those skilled in the art. In addition, alternative embodiments may couple a display adapter to local bus 2009 thereby taking advantage of the generally higher bandwidth and throughput of local bus 2009 for screen updates (when compared to alternatives such as ISA, EISA, and Micro Channel Architecture busses). Because display device requirements are typically less demanding in network server configurations than in personal computer or workstation configurations, display adapter 2020 is shown connected to the lower bandwidth ISA bus 2010.

IDE controller 2008 is representative of a variety of controller designs (including IDE, enhanced IDE, ATA, and Enhanced Small Device Interface (ESDI) controller designs) for interfacing storage devices such as disks, tape drives, and CD-ROMs. IDE controller 2008 is connected to two disks (hard disk 2011 and floppy disk 2012) and to a tape backup unit 2013. Alternative configurations may interface an IDE/ enhanced IDE CD-ROM via IDE controller 2008, although a both a CD-ROM 2015 and a CD jukebox 2017 are interfaced via a Small Computer System Interface (SCSI) adapter 2018 in the embodiment shown in FIG. 12. Suitable designs for hard disks, floppy disks, CD-ROMs, and tape drives are all well known in the art and modular components based on those designs are commonly available for IDE, enhanced IDE, and ATA based controller designs. IDE controller 2008 is of any such suitable design, including enhanced IDE, ATA, and ESDI alternatives.

SCSI adapter 2018 is connected to local bus 2009 and to multiple SCSI devices (illustratively, to a Redundant Array of Inexpensive Disks (RAID) 2014, CD-ROM 2015, scanner 2016, and CD jukebox 2017) in a daisy chain configuration. For illustrative purposes, the daisy chain of SCSI devices is shown as a bus in FIG. 12. Additional SCSI devices may also be connected to SCSI adapter 2018 and additional SCSI adapters may be connected to local bus 2009 to provide even larger numbers of SCSI device connections. Additionally, SCSI adapter 2018 and/or additional SCSI adapters may be connected to an Industry Standard Architecture (ISA) bus such as ISA bus 2010, although coupling to a local bus such as local bus 2009 is generally preferable because of the higher bandwidth and throughput of local busses conforming to standards such as the VL bus or PCI standards.

In addition to the set of SCSI devices shown in FIG. 12, additional hard disks printers, LAN adapters and other computer systems may be connected to superscalar processor 120 via a SCSI adapter such as SCSI adapter 2018. Additionally, SCSI adapter 2018 is representative of suitable alternative device adapters such as SCSI-2 and ESDI adapters. Suitable designs for RAIDs, scanners, CD-ROM jukeboxes, hard disks, CD-ROMs, printers, LAN adapters and tape drives are all well known in the art and modular components based on those designs are commonly available for SCSI adapter designs. SCSI adapter 2018 is of any such suitable design, including SCSI-2 and ESDI alternatives.

LAN adapter 2019 is connected to local bus 2009 and, in the embodiment of FIG. 12, supports an IEEE 802.3 Carrier Sense Multiple Access with Collision Detection (CSMA/ CD) local area network, although adapters for alternative network configurations and for media variations of an 802.3 network are also be suitable. LAN adapter 2019 is therefore representative of suitable alternative device adapters such as those based on IEEE 802.xstandards (e.g., 802.3 baseband ethernet on coaxial media, twisted and untwisted pair media, and 10base-T, 802.3 broadband networks, 802.4 token passing networks, 802.5 token ring networks, etc.), and those based on Fiber Distributed Data Interface (FDDI) standards. Designs for such suitable network adapters are well known in the art and modular components based on those designs are commonly available for both VL bus and PCI bus connections. In addition, suitable designs for network adapters with ISA, SCSI, and SCSI-2 interfaces are also are well known in the art and modular components based on those designs are also commonly available. Alternative embodiments may therefore incorporate LAN adapters such as LAN adapter 2019 connected to superscalar processor 120 via ISA bus 2010 or SCSI adapter 2018, although coupling to a local bus such as local bus 2009 is generally preferable to the ISA bus alternative because of the higher bandwidth and throughput of local busses conforming to standards such as the VL bus or PCI standards. LAN adapter 2019 is of any suitable design, for any suitable network topology and medium, and is connected to any of the suitable bus structures (e.g., VL bus, PCI bus, ISA bus, SCSI, etc.).

ISA bus 2010 is connected to local bus 2009 via bridge and peripheral controller 2006. Suitable bridges, like system controller 2005 bridge, are well known in the art and bridge and peripheral controller 2006 is of any suitable design. ISA bus 2010 provides a lower-speed (when compared to local bus 2009), 16-bit I/O bus and provides modular connections for a variety of peripheral components including display adapter 2020, telephony card 2026, and a multifunction 1/0 card such as super I/O 2028. Display adapters such as display adapter 2020 are well known in the art and provide varying degrees of support for advanced graphics functions. For example, simple text display adapters provide text and character based graphics only. More sophisticated display adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queueing, and texture mapping. As described above, display device requirements have typically been less demanding in network server configurations than in personal computer or workstation configurations. As a result, display adapter 2020 is shown connected to the relatively low bandwidth ISA bus 2010. However, alternative embodiments may couple an advanced or specialized display adapter to local bus 2009 thereby taking advantage of the generally higher bandwidth and throughput of local bus 2009 for screen updates (when compared to alternatives such as ISA, EISA, and Micro Channel Architecture busses).

Super I/O 2028 provides support for a serial port 2022, a parallel port 2023, a pointing device 2024, and a disk 2025. Suitable designs for combination ISA cards such as super I/O 2028 are well known in the art and such cards are commonly available. Super 1/0 2028 is of any such suitable design. Modems may be connected via serial port 2022 and printers may be connected via either the serial port 2022 or parallel port 2023 provided by super I/O 2028. Alternatively, a single function ISA card may be used for such purposes. Modem and fax/modem cards are one example of such a single function card. Telephony card 2026 is representative of cards providing voice, fax, and speech recognition, modem, fax-on-demand services, etc. Suitable telephony cards typically conform to standards defining a modular architecture for integrating computer-based application with telephony hardware. These standards include the Communicating Applications Specification (CAS) and the more comprehensive Signal Computing System Architecture (SCSA) standard. Telephony card 2026 is of any such suitable design.

Preferably, a high performance server configuration, such as that shown in FIG. 12, includes a hierarchy of busses with varying performance characteristics each matched to the devices and components connected thereto. Those skilled in the art will recognize a variety of suitable variations on the bus hierarchy shown in FIG. 12, including the elimination individual busses, the addition of multiple instances of individual busses, and redistribution of devices and components among the various busses. The server configuration shown in FIG. 12 is representative of all such suitable variations.

A multimedia workstation configuration for superscalar processor 120 shown in FIG. 13. As with the server configuration shown in FIG. 12, the multimedia workstation configuration includes a hierarchy of busses with varying performance characteristics each matched to the devices and components connected thereto. Those skilled in the art will recognize a variety of suitable variations on the bus hierarchy shown in FIG. 13. Memory bus 3002 couples superscalar processor 120, cache 3001, memory 3003, and bridge 3004. As with the network server configuration shown in FIG. 12, a variety of cache configurations are suitable for a multimedia workstation. In the embodiment shown in FIG. 13, superscalar processor 120 includes an on-board level 1 cache (i.e., the instruction cache 214 and data cache 216 shown in FIG. 2). A level 2 cache (i.e., cache 3001) including control logic is connected to superscalar processor 120 via memory bus 3002. Alternate embodiments of superscalar processor 120, may incorporate functionality of level 2 cache control logic thereby enabling a direct connection to level 2 cache storage. Furthermore, alternative embodiments may relocate all cache support to cache 3001, although at least a level 1 cache is preferably on-chip with the out-of-order execution engine 222 (see FIG. 2) of superscalar processor 120. Suitable modifications to the cache configuration shown in FIG. 12 will be apparent to those skilled in the art.

I/O bus 3005 is comparable to local bus 2009 shown in FIG. 12 and is preferably a high speed I/O bus such as a VL bus or PCI bus. SCSI adapter 3006, LAN adapter expansion bus bridge 3008, graphics adapter 3009, sound adapter 3024, and motion video adapter 3021 are connected to each other and to superscalar processor 120 via I/O bus 3005. SCSI adapter 3006, LAN adapter 3007, and expansion bus bridge 3008, together with the components and devices connected to each are comparable to corresponding adapters, components, and devices discussed above with reference to FIG. 12.

In particular, SCSI adapter 3006 is connected to multiple SCSI devices (illustratively, disk 3011, tape backup unit 3012, and CD-ROM 3013) in a daisy chain configuration. For illustrative purposes, the daisy chain of SCSI devices is shown as a bus. Additional SCSI devices may also be connected to SCSI adapter 3006. Suitable designs for SCSI adapter 3006 are discussed above with reference to the comparable SCSI adapter 2018 shown in FIG. 12. Variations on the set of SCSI devices, and on SCSI configurations in general (each of which has been described above with reference to FIG. 12) are also applicable in the multimedia workstation configuration shown in FIG. 13. Similarly, suitable designs and variations on LAN adapter 3007 are also described above in the context of the comparable LAN adapter 2019 (see FIG. 12). Furthermore, suitable designs and variations on expansion bus 3017 are described above in the context of the comparable ISA bus 2010 (see FIG. 12). As described above, suitable designs for SCSI adapter 2018 and ISA bus 2010 are well known in the art and modular components based on such suitable designs are commonly available. SCSI adapter 3006, LAN adapter 3007, and expansion bus 3017 (together with the components and devices connected thereto) are comparable. SCSI adapter 3006, LAN adapter 3007, expansion bus bridge 3008, and expansion bus 3017 are therefore also of any such suitable designs.

As shown above in FIG. 2, out-of-order execution engine 222 of superscalar processor 120 includes a multimedia unit 157 for executing multimedia extensions to the x86 instruction set. Referring again to FIG. 13, multimedia adapters, such as sound adapter 3024, motion video adapter 3021, and graphics adapter 3009, are each connected to superscalar processor 120 via I/O bus 3005 and memory bus 3002 to provide for high-bandwidth transfers of multimedia data between the multimedia adapters, memory 3003, and secondary storage devices (e.g., disk 3011). Sound adapter 3024 provides digital-to-analog (D/A) and analog-to-digital (A/D) interfaces for respectively synthesizing and sampling audio signals. The D/A and A/D interfaces of sound adapter 3024 are respectively connected to an audio performance device, such as a speaker 3026, and an audio signal acquisition device, such as a microphone 3025. Other suitable audio performance devices include mixing consoles, signal processing devices, synthesizers, MIDI sequencers and power amplifiers. Other suitable audio signal acquisition devices include signal processing devices and digital samplers. Suitable designs for sound cards are well known in the art and sound adapter 3024 is of any such suitable design.

Motion video adapter 3021 provides support for capture and compression of video signals, for example, from video camera 3020. In addition, motion video adapter 3021 supplies a display device 3023 such as a television, high-definition television, or a high resolution computer monitor with display signals via a frame buffer 3022. Alternative embodiments of motion video adapter 3021 may eliminate the frame buffer 3022 and directly drive a raster display. Furthermore, alternative embodiments of motion video adapter 3021 may decouple the video input and video output functionality of motion video adapter 3021, and instead provide separate video input and video output components.

Because video information requires large amounts of storage space, it is generally compressed. Accordingly, to display compressed video information, for example from data represented on a compact disk in CD-ROM 3013, the compressed video information must be decompressed. High bandwidth burst mode data transfers are supported by I/O bus 3005, which is preferably a local bus such as PCI with support for arbitrary length burst data transfers. In the multimedia workstation configuration shown in FIG. 13, video compression and decompression can be performed by superscalar processor 120 (executing multimedia instructions in multimedia unit 157) and/or by motion video adapter 3021. Thus, memory bus 3002 and bridge 3004 preferably support burst data transfers across the bridge 3004 between memory bus 3002 and I/O bus 3005. Suitable designs for motion video adapters typically provide support for the Moving Pictures Expert Group (MPEG) standards for video encoding and decoding (e.g., MPEG-1 and MPEG-2) and for JPEG. In addition, motion video adapter 3021 may support video conferencing by providing implementing video compression/decompression algorithms in accordance with H.261 (the standard compression algorithm for H.320 videoconferencing). Suitable designs for implementing such compression/decompression algorithms are well known in the art and motion video adapter 3021 is of any such suitable design.

Graphics adapters such as graphics adapter 3009 are well known in the art and provide varying degrees of support for advanced graphics functions. For example, graphics adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queueing, and texture mapping. Suitable designs for graphics adapters are well known in the art and modular components based on these designs are commonly available. Graphics adapter 3009 is of any such suitable design. Alternative embodiments my combine the graphics display functionality of graphics adapter 3009 with the motion video display functionality of motion video adapter 3021 outputing on a single high-resolution display device.

While the invention has been described with reference to various embodiments, it will be understood that these embodiments are illustrative and that the scope of the invention is not limited to them. Many variations, modifications, additions, and improvements of the embodiments described are possible. Additionally, structures and functionality presented as hardware in the exemplary embodiment may be implemented as software, firmware, or microcode in alternative embodiments. For example, the description depicts a macroinstruction decoder having short decode pathways including three rotators 430, 432 and 434, three instruction registers 450, 452 and 454 and three short decoders SDec0 410, SDec1 412 and SDec2 414. In other embodiments, different numbers of short decoder pathways are employed. A decoder that employs two decoding pathways is highly suitable. These and other variations, modifications, additions, and improvements may fall within the scope of the invention as defined in the claims which follow.

What is claimed is:

1. A network server comprising:
   a superscalar processor including an instruction decoder;
   an external memory coupled to the superscalar processor and operable to store a plurality of modifiable encoded SMM instructions defined by RISC operation sequences;
   a means coupled to the superscalar processor for activating a system management activation signal;
   an instruction memory coupled to the superscalar processor and operable to store a software program including:
      an SMM initialization routine defined by at least a first one of the plurality of modifiable encoded SMM instructions;
      a routine for redirecting SMM operations to the plurality of modifiable encoded SMM instructions; and
      an SMM termination routine defined by at least a second one of the plurality of modifiable encoded SMM instructions;
   a processor bus coupled between the instruction memory and the superscalar processor;
   a local bus and an I/O bus;
   first and second bridges, respectively coupling the processor bus to the local bus and the local bus to the I/O bus; and
   a LAN adapter coupled to one of the local bus and the I/O bus.

2. A network server, as recited in claim 1, further comprising:
   a data storage device coupled to one of the local bus and the I/O bus.

3. A network server, as recited in claim 2, wherein the storage device comprises a hard disk.

4. A network server, as recited in claim 3, wherein the hard disk is selected from the group consisting of an IDE disk, an enhanced IDE disk, an ATA disk, an ESDI disk, and a SCSI disk.

5. A network server, as recited in claim 2, wherein the storage device comprises a tape unit.

6. A network server, as recited in claim 5, wherein the tape unit is selected from the group consisting of an IDE tape unit, an enhanced IDE tape unit, an ATA tape unit, an ESDI tape unit, and a SCSI tape unit.

7. A network server, as recited in claim 2, wherein the storage device comprises a CD-ROM.

8. A network server, as recited in claim 7, wherein the CD-ROM is selected from the group consisting of an IDE CD-ROM, an enhanced IDE CD-ROM, an ATA CD-ROM, an ESDI CD-ROM, and a SCSI CD-ROM.

9. A network server, as recited in claim 2, wherein the storage device comprises a jukebox.

10. A network server, as recited in claim 2, wherein the storage device comprises a RAID.

11. A network server, as recited in claim 2, wherein the storage device comprises a flash memory.

12. A network server, as recited in claim 1, wherein the LAN adapter is selected from the group consisting of a baseband network LAN adapter, a broadband network LAN adapter, a token passing network LAN adapter, a token ring network LAN adapter, a 10base-T network LAN adapter, and an ethernet LAN adapter.

13. A network server, as recited in claim 1, wherein the local bus comprises a VL bus.

14. A network server, as recited in claim 1, wherein the local bus comprises a PCI bus.

15. A network server, as recited in claim 1, wherein the I/O bus is selected from the group consisting of an ISA bus, an EISA bus, a Micro Channel Architecture Bus, and a local bus.

16. A network server, as recited in claim 1, further comprising:
   a communications device coupled to one of the local bus and the I/O bus.

17. A network server, as recited in claim 16, wherein the communications device comprises one of a modem, a faxmodem, and an integrated telephony device.

18. A network server, as recited in claim 17, wherein the communications device further comprises a printed circuit card coupled to one of the local bus and the I/O bus via a modular connector.

19. A network server, as recited in claim 17, wherein the communications device is coupled to one of the local bus and the I/O bus via a serial interface.

20. A network server, as recited in claim 1, further comprising:
an I/O device coupled to one of the local bus and the I/O bus.

21. A network server, as recited in claim 20, wherein the I/O device is selected from the group consisting of a text display adapter, a graphics adapter, a 3-D graphics adapter, a SVGA display adapter, an XGA adapter, a display adapter supporting VESA graphics standards, a CGA adapter, an adapter supporting Hercules graphics standards.

22. A network server, as recited in claim 20, wherein the I/O device is selected from the group consisting of a pointing device, a mouse, a trackball, and a keyboard.

23. A multimedia computer system incorporating a processor including an adaptable system management mode (SMM) implementation, the multimedia computer system comprising:
a multimedia performance device;
a multimedia adapter coupled to the multimedia performance device and coupled to the multimedia signal acquisition device, the multimedia adapter including a signal conversion interface for synthesizing and sampling multimedia signals;
an input/output bus coupled to the multimedia adapter for communicating transfers of multimedia data;
a superscalar processor coupled to the input/output bus for processing multimedia data and controlling communication of multimedia data between the superscalar processor and the multimedia adapter, the superscalar processor including an instruction decoder;
an external memory coupled to the superscalar processor and operable to store a plurality of modifiable encoded SMM instructions defined by RISC operation sequences;
a means coupled to the superscalar processor for activating a system management activation signal; and
an instruction memory coupled to the superscalar processor and operable to store a software program including:
an SMM initialization routine defined by at least a first one of the plurality of modifiable encoded SMM instructions;
a routine for redirecting SMM operations to the plurality of modifiable encoded SMM instructions; and
an SMM termination routine defined by at least a second one of the plurality of modifiable encoded SMM instructions.

24. A multimedia computer system according to claim 23 further comprising:
a multimedia signal acquisition device.

25. A multimedia computer system according to claim 24 wherein:
the multimedia performance device includes a motion video display selected from the group of televisions, high-definition televisions and high resolution computer monitors;
the multimedia signal acquisition device includes a video camera; and
the multimedia adapter includes a motion video adapter.

26. A multimedia computer system according to claim 25 wherein:
the multimedia performance device includes a video frame buffer.

27. A multimedia computer system according to claim 25 wherein:
the multimedia adapter performance device includes a system for video encoding and decoding in accordance with Moving Pictures Expert Group (MPEG) standards.

28. A multimedia computer system according to claim 23 wherein:
the multimedia performance device includes a video frame buffer and a graphics display selected from the group of televisions, high-definition televisions and high resolution computer monitors; and
the multimedia adapter includes a graphics adapter selected from the group of SVGA, XGA, VESA, CGA and Hercules graphic standard adapters.

29. A multimedia computer system according to claim 23 wherein:
the multimedia performance device includes an audio performance device selected from among the group of mixing consoles, signal processing devices, synthesizers, MIDI sequencers, power amplifiers and speakers; and
the multimedia adapter includes an audio adapter selected from among the group of D/A interfaces and A/D interfaces.

30. A multimedia computer system according to claim 29 further comprising:
a multimedia signal acquisition device including an audio signal acquisition device selected from among the group including microphones, signal processing devices and digital samplers.

31. A multimedia computer system according to claim 23 further comprising:
an SCSI adapter coupled to the input/output bus; and
a read/write storage media coupled to the SCSI adapter for storing and accessing data including multimedia data.

32. A multimedia computer system according to claim 31 wherein the read/write storage media include media selected from among the group of magnetic disk drives, magnetic tape drives and CD-ROM drives.

33. A multimedia computer system according to claim 23 further comprising:
a local area network (LAN) adapter coupled to the input/output bus.

* * * * *